US009265010B2

(12) United States Patent
Murai et al.

(10) Patent No.: US 9,265,010 B2
(45) Date of Patent: Feb. 16, 2016

(54) WIRELESS COMMUNICATION SYSTEM, TRANSMISSION POWER CONTROL METHOD, AND NETWORK CONTROL APPARATUS

(71) Applicant: HITACHI KOKUSAI ELECTRIC INC., Tokyo (JP)

(72) Inventors: Shinji Murai, Tokyo (JP); Takashi Ishikawa, Tokyo (JP); Tsuyoshi Tamaki, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 14/412,041

(22) PCT Filed: Jun. 28, 2013

(86) PCT No.: PCT/JP2013/067797
§ 371 (c)(1),
(2) Date: Dec. 30, 2014

(87) PCT Pub. No.: WO2014/007158
PCT Pub. Date: Jan. 9, 2014

(65) Prior Publication Data
US 2015/0148091 A1   May 28, 2015

(30) Foreign Application Priority Data
Jul. 4, 2012   (JP) ................. 2012-150794

(51) Int. Cl.
*H04B 7/00*   (2006.01)
*H04W 52/24*   (2009.01)
(Continued)

(52) U.S. Cl.
CPC .............. *H04W 52/24* (2013.01); *H04W 16/10* (2013.01); *H04W 16/14* (2013.01);
(Continued)

(58) Field of Classification Search
CPC ... H04W 52/20; H04W 52/24; H04W 52/241; H04W 52/242; H04W 52/243; H04W 52/245; H04W 72/0453; H04B 17/21; H04B 17/318
USPC .................. 455/522, 501, 509, 436, 69, 13.4, 455/127.1–127.5; 370/318, 335; 713/320
See application file for complete search history.

(56) References Cited

U.S. PATENT DOCUMENTS
2011/0009141 A1   1/2011   Harada et al.

FOREIGN PATENT DOCUMENTS
JP   2010-178225 A   8/2010
JP   2011-019203 A   1/2011

OTHER PUBLICATIONS

IEEE, "Draft Standard for Wireless Regional Area Networks Part 22: Cognitive Wireless RAN Medium Access Control (MAC) and Physical Layer(PHY) specifications: Policies and procedure for operation in the TV Bands", 802.22/P802.22/D3.0, Mar. 2011.
(Continued)

*Primary Examiner* — Shaima Q Aminzay
(74) *Attorney, Agent, or Firm* — Volpe and Koenig, P.C.

(57) ABSTRACT

The objective of the invention is to improve the communication performance of a secondary system within such a range that does not affect a primary system. A wireless communication system comprises: a primary system that can use a given frequency on a priority basis; secondary wireless communication systems each of which is operated with the same frequency; and a network control apparatus that controls the secondary wireless communication systems. The network control apparatus comprises: a primary system information acquiring unit that acquires information of the primary system; a secondary system information acquiring unit that acquires communication quality information of the secondary wireless communication systems; and an optimum computing unit that calculates, on the basis of the primary and secondary system information acquiring units, the transmission powers of a plurality of base stations of the secondary wireless communication systems.

16 Claims, 22 Drawing Sheets

(51) Int. Cl.
  *H04W 16/14* (2009.01)
  *H04W 16/10* (2009.01)
  *H04W 52/14* (2009.01)
  *H04W 52/22* (2009.01)
  *H04W 52/38* (2009.01)
  *H04W 52/36* (2009.01)

(52) U.S. Cl.
  CPC ......... *H04W 52/143* (2013.01); *H04W 52/226* (2013.01); *H04W 52/244* (2013.01); *H04W 52/245* (2013.01); *H04W 52/386* (2013.01); *H04W 52/367* (2013.01)

(56) References Cited

OTHER PUBLICATIONS

Sengupta, S. et al., "Self-coexistence among interference-aware IEEE 802.22 networks with enhanced air-interface", Pervasive and Mobile Computing, vol. 9, Elsevier, Sep. 5, 2011, pp. 454 to 471.

Lee, Dong Neon et al., Self-Coexistence Techniques for Cognitive Radio LANs/PANs,Personal Indoor and Mobile Radio Communications (PIMRC), 2010 IEEE 21st International Symposium on, Sep. 30, 2010, pp. 1516 to 1520.

SECONDARY SYSTEM COMMUNICATION QUALITY INFORMATION(4071)

| CPEID /time | LocationCPE /time | AddressCPE /time | Channel /time | Received Power /time |
|---|---|---|---|---|
| CPE1 | | | $y_i$ / aa:bb:cc | $S_1$ / aa:bb:cc |
| CPE2 | | | $y_i$ / dd:ee:ff | $S_2$ / dd:ee:ff |
| .. | .. | .. | .. | .. |

FIG.11

SECONDARY SYSTEM COMMUNICATION QUALITY INFORMATION SET (6032)

| | | CPEID /time | LocationCPE /time | AddressCPE /time | BSID /time | LocationBS /time | AddressBS /time | Channel /time | Received Power /time |
|---|---|---|---|---|---|---|---|---|---|
| BS a | CPE1 | | | | | | | $y_a$ / aa:bb:cc | $S_{a1}$ / aa:bb:cc |
| | CPE2 | | | | | | | $y_b$ / dd:ee:ff | $S_{a2}$ / dd:ee:ff |
| | .. | | | | | | | .. | .. |
| BS b | CPE1 | | | | | | | $y_a$ / aa:bb:cc | $S_{b1}$ / aa:bb:cc |
| | CPE2 | | | | | | | $y_b$ / dd:ee:ff | $S_{b2}$ / dd:ee:ff |
| | .. | | | | | | .. | .. | .. |
| | | .. | .. | .. | .. | .. | .. | .. | .. |

FIG.13

| to \ from | PRIMARY SYSTEM TV(0) | SECONDARY SYSTEM BS(1) | SECONDARY SYSTEM BS(2) | |
|---|---|---|---|---|
| PRIMARY SYSTEM TV(0) CPE(j) | - | $S_{1j}$ (Interference Power) | $S_{2j}$ (Interference Power) | $INR_j = (x_1 S_{1j} + x_2 S_{2j})/N$ |
| SECONDARY SYSTEM BS(1) CPE(k) | $S_{0k}$ (Interference Power) | $S_{1k}$ (Signal Power) | $S_{2k}$ (Interference Power) | $SINR_{1k} = (x_1 S_{1k})/(S_{0k} + x_2 S_{2k} + N)$ |
| SECONDARY SYSTEM BS(2) CPE(l) | $S_{0l}$ (Interference Power) | $S_{1l}$ (Interference Power) | $S_{2l}$ (Signal Power) | $SINR_{2l} = (x_2 S_{2l})/(S_{0l} + x_1 S_{1l} + N)$ |

FIG.17

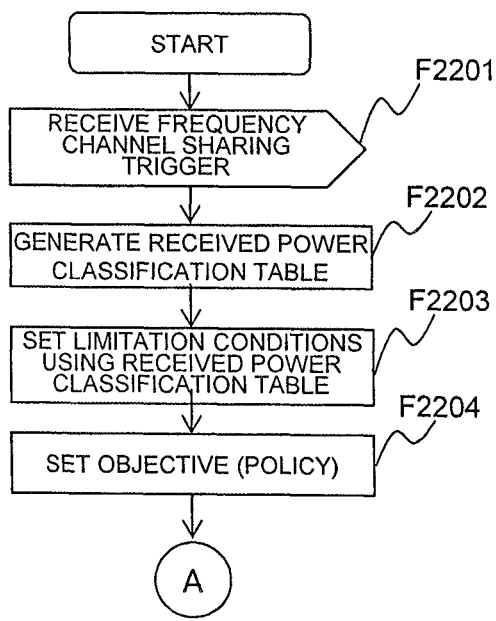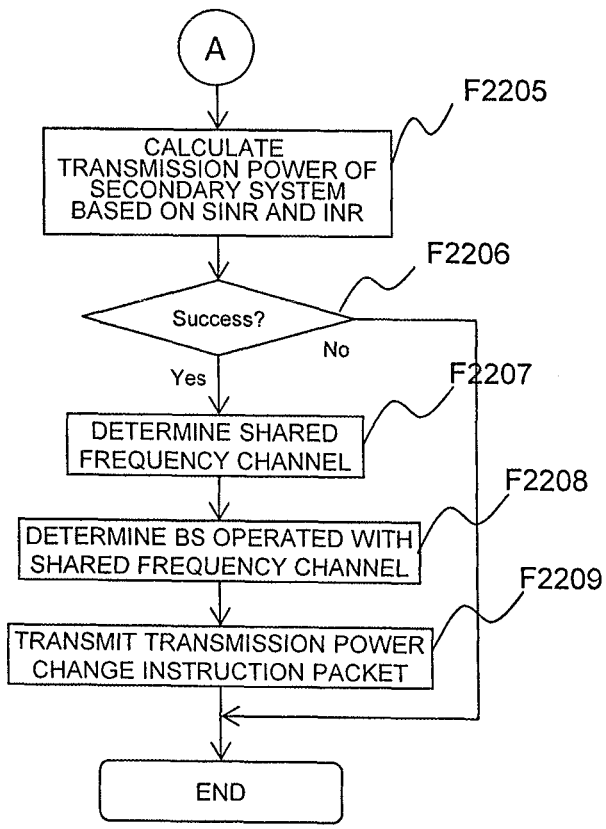
FIG.22

WIRELESS COMMUNICATION SYSTEM, TRANSMISSION POWER CONTROL METHOD, AND NETWORK CONTROL APPARATUS

TECHNICAL FIELD

The present invention relates to a wireless communication system, a transmission power control method, and a network control apparatus, and particularly, to a wireless communication system, a transmission power control method, and a network control apparatus secondarily using the same frequency as an allocated frequency used by a wireless system primarily.

BACKGROUND ART

Traffic is expected to increase further with as mobile broadband becomes widespread. For this reason, it is necessary to ensure new radio-wave resources. However, since bands conveniently used in mobile systems, for example, bands equal to or less than 6 GHz, have already been allocated densely, a shortage state of radio waves has occurred. In order to realize new radio-wave uses, it is necessary to flexibly use the radio waves in future by using frequency bands (white spaces) available "spatially," "temporally," and "technically," even when the frequencies are the allocated frequencies, while sufficiently avoiding interference in the existing works.

With such a tendency, research, development, and standardization of wireless communication systems using the white spaces have progressed in all the countries of the world. In the United State of America, an instruction to acknowledge use of the white spaces was adopted in November 2008 and work including establishment of specific technical standards and construction of databases has been carried out in Federal Communications Commission (FCC). In Europe, Office of Communications (Ofcom) has carried out research and development of new wireless technologies for the objective of utilizing the white spaces in various countries by suggesting guidelines for liberation of the white spaces. In the standardization organizations of IEEE SCC 41, IEEE802.22, IEEE802.19, and the like, efforts to standardize technologies for utilizing the white spaces to a high degree have been actively made.

In wireless communication systems utilizing the white spaces, wireless systems (secondary systems) originally not permitted to use frequencies share frequencies according to the surrounding environment in frequency bands used by existing wireless systems (primary systems) using allocated frequencies. In this scheme, only when the primary systems do not use frequency bands spatially and temporally, the secondary systems are permitted to use the frequency bands. To adjust the frequencies, databases (DBs) that store secondary system permission information used to permit the secondary systems to use the frequencies are prepared in the wireless communication systems utilizing the white spaces.

In particular, in wireless communication systems utilizing the white spaces of TVs, the fact that the TVs do not use frequencies can be confirmed in advance by databases. Therefore, transmission power of the maximum level is used in many cases.

PTL 1 suggests a method of adaptively changing the values of permissible interference power and maximum transmission power in regard to primary systems according to communication quality of the primary systems. PTL 2 suggests a method of expanding a signal transmission opportunity in a secondary wireless communication system which is a non-priority system when a base station of a first wireless communication system which is a non-priority system increases a permissible interference level of a first wireless communication system signal transmitted using a shared frequency band based on expected interference power reported from a transmission station of the second wireless communication system which is a priority system.

In the standard IEEE802.22 (NPL 1) standardized for a wireless communication system utilizing the white space of a TV, an Etiquette Mode function is introduced to determine a frequency channel which does not overlap with a frequency between adjacent cells from frequency information or a policy obtained by self-station location information or a DB. When use of a primary system is detected as in terrestrial digital broadcasting by a Spectrum Sensing function, a structure (IDRP) is provided to transfer a channel to another backup channel determined in advance. In the IEEE802.22, control is performed such that a frequency channel overlaps between adjacent cells as little as possible. However, when a frequency channel is insufficient and a frequency has to be shared between the BS and the BS installed at a distance at which mutual interference occurs, a Self-coexistence function is used. The Self-coexistence function is a function necessary in order to share a frequency channel without mutual interference even between adjacent cells in an IEEE802.22 system.

FIG. 1 illustrates a flowchart of the Self-coexistence function.

Inter-cell information such as a frequency channel already used in Power-on of a BS (F100) and Network Discovery is acquired (F101). Acquisition of a frequency channel to be used is attempted according to Etiquette Mode (F102 and F103). When there is the frequency channel to be used, the frequency channel is used to perform communication (F104 and F110). When there is no available frequency channel, the BS enters Self-Coexistence Mode and a frequency channel used by an adjacent cell is shared to be used (F108, F109, and F110). The Self-coexistence function has On-Demand Frame Contention (F106) in which only a node acquiring a transmission right can perform communication and DS/US Split Adjustment (F107) in which a ratio of downlink and uplink communication times between the adjacent cells is adjusted, and On-Demand Frame Contention and DS/US Split Adjustment are executed by self-determination of the IEEE802.22 BS.

CITATION LIST

Patent Literature

[PTL 1] JP-A-2010-178225
[PTL 2] JP-A-2011-19203

Non Patent Literature

[NPTL 1] IEEE 802.22/P802.22/D3.0, March 2011, Draft Standard for Wireless Regional Area Networks Part 22: Cognitive Wireless RAN Medium Access Control (MAC) and Physical Layer (PHY) specifications: Policies and procedure for operation in the TV Bands.

SUMMARY OF INVENTION

Technical Problem

FIG. 2 is a diagram for describing a problem of the related art.

Hereinafter, the problem of the related art will be described with reference to FIG. 2. As described above, in wireless communication systems utilizing the white spaces of TVs, the fact that the primary systems do not use frequencies can be confirmed in advance by databases. Therefore, transmission power of the maximum level is used in many cases. However, when a TV which is a primary system and BS, BS, and BS (BSa, BSb, and BSc) which are secondary systems are disposed densely and the secondary systems perform transmission at the maximum level during use of the same channel as in FIG. 2, broad mutual interference areas (1000) can occur between the BS and BS. Therefore, the communication performance of the secondary systems may deteriorate.

In PTL 1 and PTL 2, transmission power of the secondary systems is controlled in consideration of an interference level to the primary system. However, communication quality between the secondary systems is not considered, which is undesirable in terms of frequency use efficiency.

When control is performed between the BS and BS at which radio waves arrive in consideration of the communication quality between the secondary systems, local control is performed (the BSa and BSb, and the BSb and BSc in FIG. 2). Thus, control of the BS (the BSb in FIG. 2) which extends over the BS and BS and at which radio waves do not arrive becomes problematic.

FIG. 3 is a diagram for describing a new problem.

Hereinafter, the new problem will be described with reference to FIG. 3. In STEP0 of FIG. 3, when transmission power control between the BSa and BSb is performed, for example, a large mutual interference area remains between the BSb and BSc as in STEP1. Next, when transmission power control between the BSb and BSc is performed, for example, an area at which radio waves do not arrive may be broadened between the BSa and BSb as in STEP2. Thus, when the control is performed by own determination of each BS, that is, autonomous distribution, it is difficult to perform entire control, and thus it is likely to take some time to perform convergence of the transmission power control.

When the Self-coexistence function is performed in the IEEE802.22 system, it is assumed that simultaneous communication between the secondary systems BS is not performed and a transmission opportunity is missed, as illustrated in FIG. 2. Since deterioration in communication performance such as an occurrence of temporal overhead occurs, it is desirable not to operate the Self-coexistence function in some cases.

The present invention is devised in view of the following and an object of the present invention is to improve the communication performance of a secondary system within a scope in which there is no influence on a primary system.

Solution to Problem

According to the first solving means of the present invention, there is provided a wireless communication system comprising:

a primary system that includes a wireless station and is able to primarily use a certain frequency;

one or a plurality of wireless communication systems, having a base station (BS), which are a secondary system that secondarily use the same frequency as that of the primary system; and a network control apparatus that controls the one or the plurality of wireless communication systems, wherein the network control apparatus includes:

a secondary system communication quality information set unit that stores a communication quality information set including identification information regarding the BS of the secondary system, identification information regarding a wireless terminal, used frequency channel information, and received power, and a control unit, wherein, when the network control apparatus receives a frequency channel sharing trigger indicating that a frequency channel operated so that a frequency does not overlap with that of an adjacent cell is insufficient from each BS of the secondary system, the control unit generates a received power classification table which classifies signal power and interference power between each wireless terminal, and the wireless station of the primary system and each BS of the secondary system, with reference to the secondary system communication quality information set unit and based on the identification information regarding the BS, the identification information regarding the wireless terminal, and the received power, the control unit calculates a transmission power amplification rate or transmission power of each secondary system using the received power classification table, and the control unit transmits a transmission power change instruction packet storing the calculated transmission power amplification rate or transmission power to each BS sharing the frequency channel of the one or the plurality of secondary systems.

According to the second solving means of the present invention, there is provided a transmission power control method in a wireless communication system, the wireless communication system comprising:

a primary system that includes a wireless station and is able to primarily use a certain frequency;

one or a plurality of wireless communication systems, having a base station (BS), which are a secondary system that secondarily use the same frequency as that of the primary system; and a network control apparatus that controls the one or the plurality of wireless communication systems, wherein the network control apparatus includes:

a secondary system communication quality information set unit that stores a communication quality information set including identification information regarding the BS of the secondary system, identification information regarding a wireless terminal, used frequency channel information, and received power, and a control unit, wherein, when the network control apparatus receives a frequency channel sharing trigger indicating that a frequency channel operated so that a frequency does not overlap with that of an adjacent cell is insufficient from each BS of the secondary system, the control unit generates a received power classification table which classifies signal power and interference power between each wireless terminal, and the wireless station of the primary system and each BS of the secondary system, with reference to the secondary system communication quality information set unit and based on the identification information regarding the BS, the identification information regarding the wireless terminal, and the received power, the control unit calculates a transmission power amplification rate or transmission power of each secondary system using the received power classification table, and the control unit transmits a transmission power change instruction packet storing the calculated transmission power amplification rate or transmission power to each BS sharing the frequency channel of the one or the plurality of secondary systems.

According to the third solving means of the present invention, there is provided a network control apparatus in a wireless communication system, the wireless communication system comprising:

a primary system that includes a wireless station and is able to primarily use a certain frequency;

one or a plurality of wireless communication systems, having a base station (BS), which are a secondary system that secondarily use the same frequency as that of the primary system; and the network control apparatus that controls the one or the plurality of wireless communication systems, wherein the network control apparatus includes:

a secondary system communication quality information set unit that stores a communication quality information set including identification information regarding the BS of the secondary system, identification information regarding a wireless terminal, used frequency channel information, and received power, and a control unit, wherein, when the network control apparatus receives a frequency channel sharing trigger indicating that a frequency channel operated so that a frequency does not overlap with that of an adjacent cell is insufficient from each BS of the secondary system, the control unit generates a received power classification table which classifies signal power and interference power between each wireless terminal, and the wireless station of the primary system and each BS of the secondary system, with reference to the secondary system communication quality information set unit and based on the identification information regarding the BS, the identification information regarding the wireless terminal, and the received power, the control unit calculates a transmission power amplification rate or transmission power of each secondary system using the received power classification table, and the control unit transmits a transmission power change instruction packet storing the calculated transmission power amplification rate or transmission power to each BS sharing the frequency channel of the one or the plurality of secondary systems.

Advantageous Effects of Invention

According to the embodiment of the present invention, it is possible to improve the communication performance of a secondary system within a scope in which there is no influence on a primary system.

BRIEF DESCRIPTION OF DRAWINGS

FIG. 11 is a diagram illustrating an example of the secondary system communication quality information acquired in the BS according to the first embodiment.

FIG. 13 is a diagram illustrating an example of the secondary system communication quality information set acquired in the network control apparatus according to the first embodiment.

FIG. 17 is a received power classification table used to calculate the transmission power control in the network control apparatus according to the first embodiment.

FIG. 22 is a flowchart illustrating control of transmission power and a frequency channel in a network control apparatus according to a second embodiment.

DESCRIPTION OF EMBODIMENTS

Figure 1:
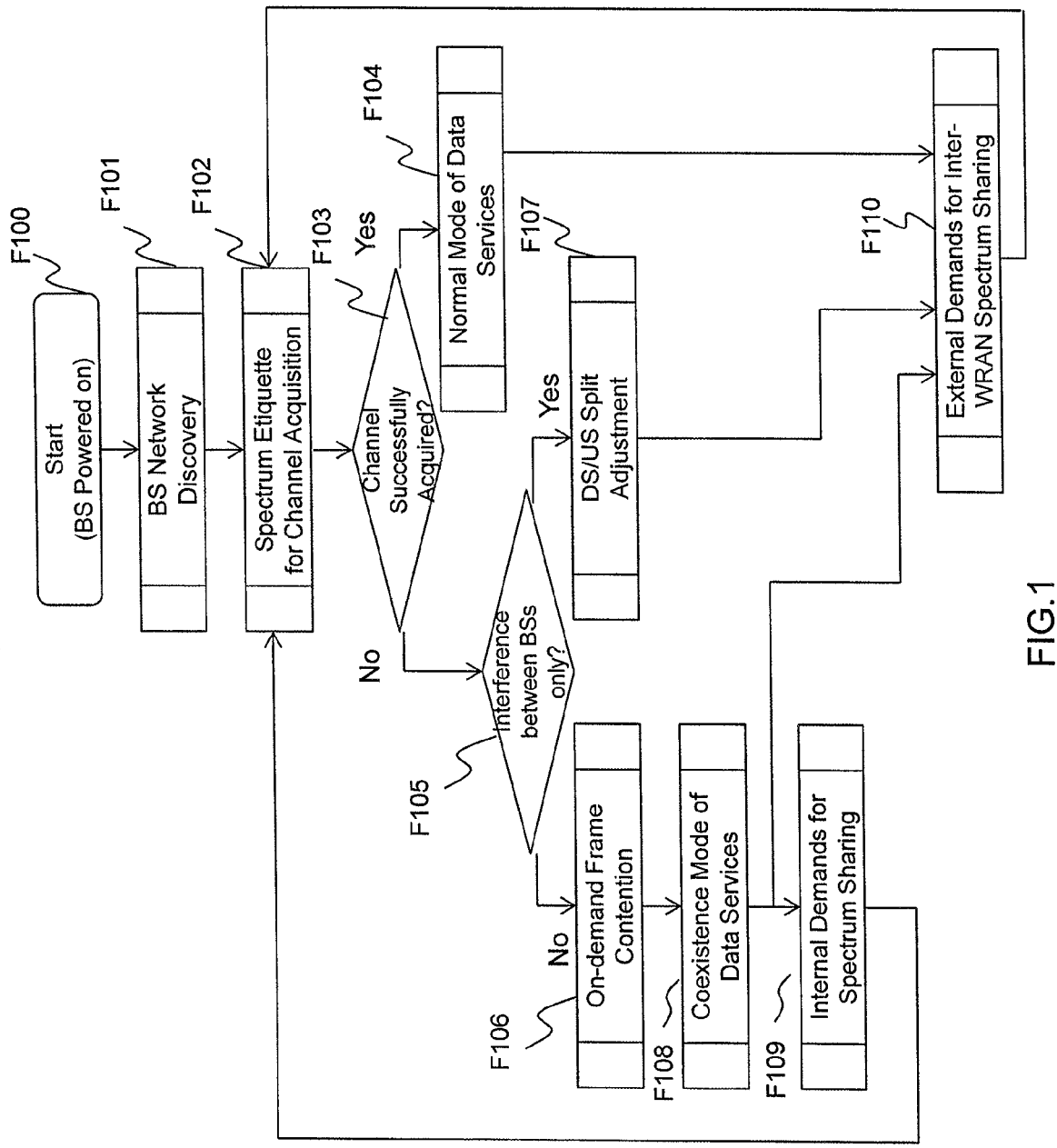
FIG. 1 is a flowchart illustrating Self-Coexistence of IEEE802.22.
Figure 2:
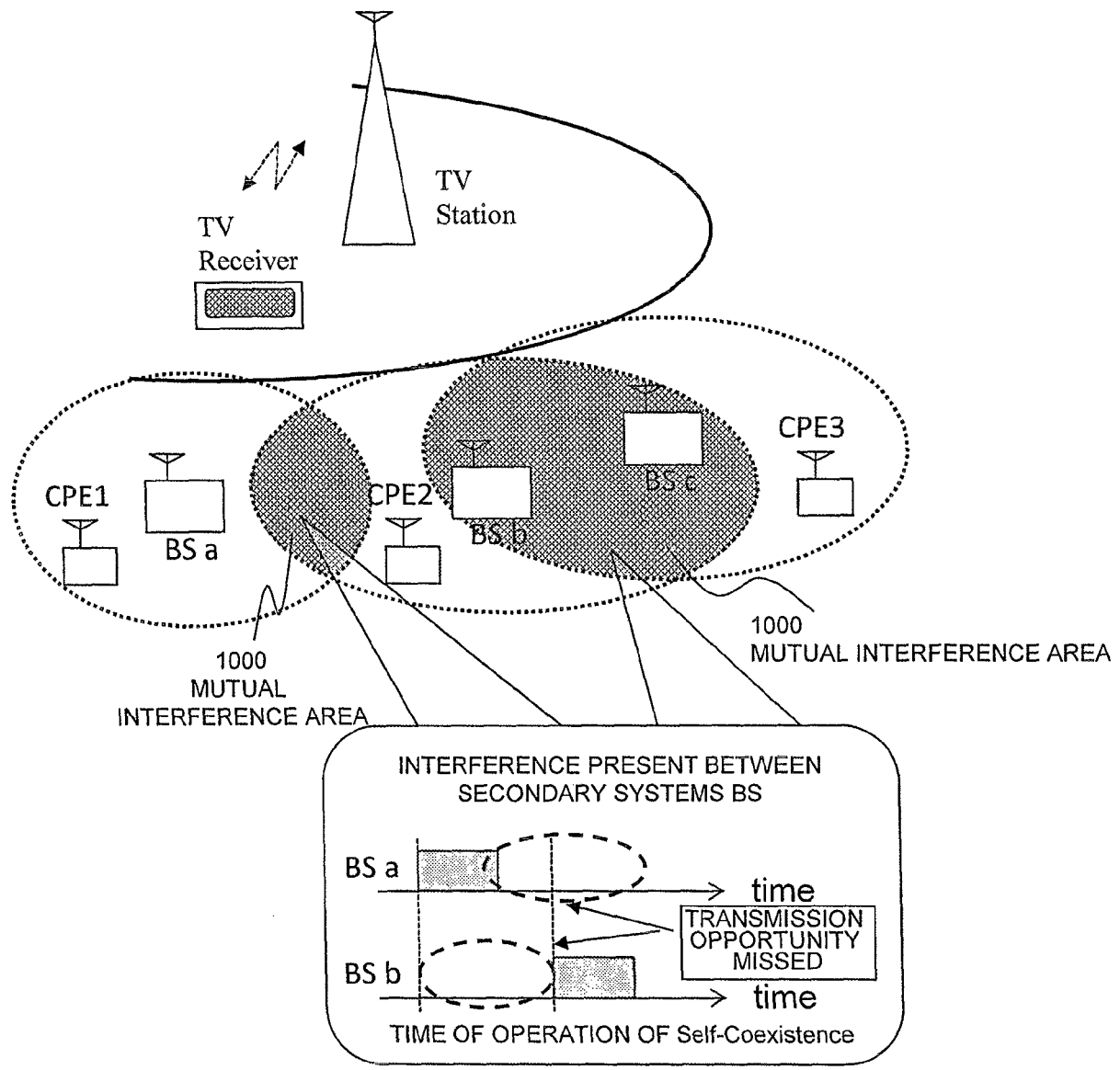
FIG. 2 is a diagram for describing a problem of the related art.
Figure 3:
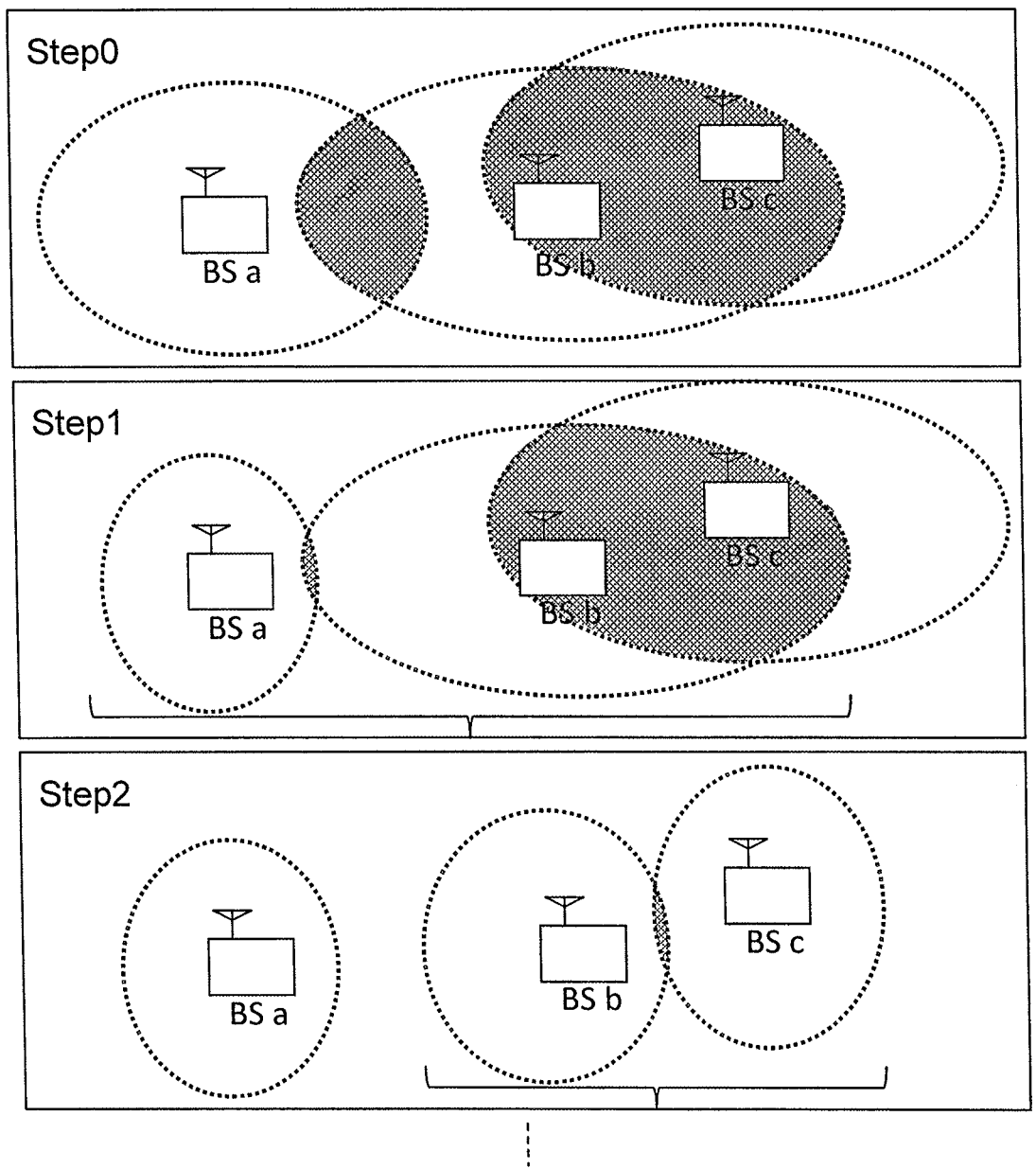
FIG. 3 is a diagram for describing a new problem.

Hereinafter, embodiments will be described with reference to the drawings.

A. Overview

In order to achieve the above object, in a transmission power control method according to the embodiment, for example, there are provided a primary system that is able to primarily use a certain frequency, a secondary wireless communication system that secondarily uses the same frequency as that of the primary system, a database that stores secondary system permission information, and a network control apparatus that controls the plurality of secondary wireless communication systems. The network control apparatus includes a secondary system permission information unit that acquires secondary system permission information and an optimal calculation unit that calculates power transmission of a plurality of BSs of the secondary wireless communication systems based on a secondary system communication quality information set unit that acquires communication quality information regarding the secondary wireless communication system.

In the transmission power control method according to the embodiment, indexes for evaluating the degree of object accomplishment, such as a communication capacity, a throughput, a frequency, and the number of users may be optimized.

The optimal calculation unit may calculate the power transmission using an interference-to-noise power ratio and a signal-to-interference power ratio in a secondary system information acquisition unit.

The secondary system communication quality information set unit can average and use the communication quality information set.

The optimal calculation unit can control the transmission power of the sharing BS using a trigger issued when a frequency channel is insufficient and a frequency has to be shared between the BS and the BS installed at a distance at which mutual interference occurs.

The optimal calculation unit may estimate overhead to calculate the transmission power when the frequency channel is insufficient and the frequency is shared between the BS and the BS installed at a distance at which mutual interference occurs.

In the embodiment, for example, there are provided a primary system that is able to primarily use a certain frequency, a secondary wireless communication system that secondarily uses the same frequency, a database that stores information which is an empty frequency of the primary system and can be used by the secondary wireless communication system, and a network control apparatus that controls the plurality of secondary wireless communication systems. A BS of the secondary wireless communication system transmits a frequency channel sharing trigger to the network control apparatus. When the network control apparatus receives the trigger, the network control apparatus calculates the transmission power of the plurality of BSs of the secondary wireless communication systems and changes the transmission power of the secondary wireless communication system by transmitting a transmission power change packet to the secondary wireless communication system.

Embodiment 1

B. First Embodiment

1. Wireless Communication System

Figure 5:
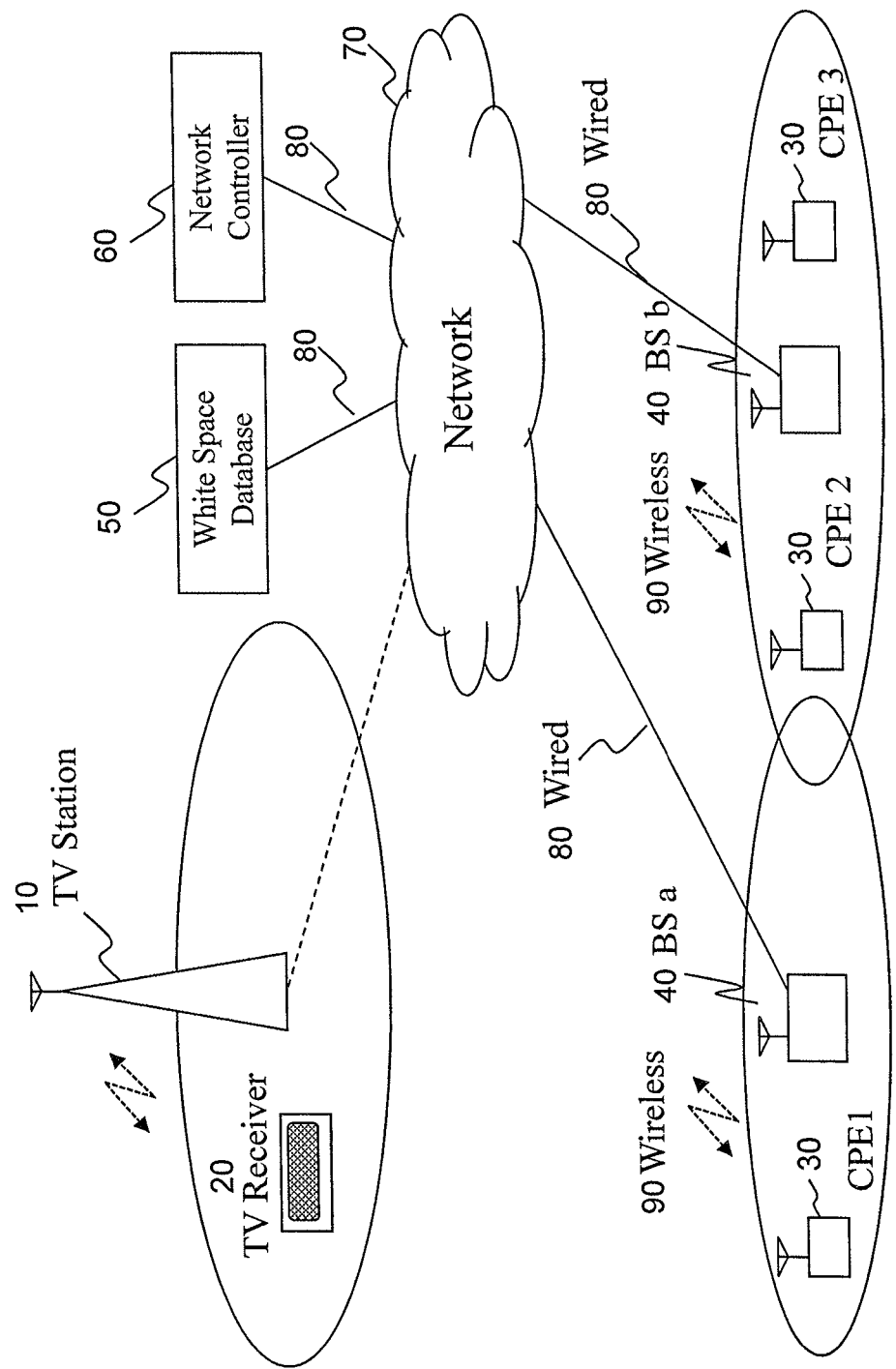
FIG. 5 is a diagram illustrating the configuration of a wireless communication system utilizing a white space according to a first embodiment.

FIG. 5 is a diagram illustrating the configuration of a wireless communication system utilizing a white space.

The wireless communication system utilizing a white space includes a TV station 10 which is a primary system, a TV receiver 20, and a base station (BS) 40, customer premises Equipment (CPE) 30, a white space database (BD) 50, and a network controller (network control apparatus) 60 which are secondary systems. The TV station 10, the BS 40, the DB 50, and the network control apparatus 60 are connected to wired networks 80 via a network 70. The network control apparatus 60 stores secondary system permission information for use permission of the secondary systems. The BS 40 and the CPE 30 are connected to a wireless network 90. The number of the TV station 10, the TV receiver 20, the CPE 30, and the BS 40 are not limited thereto. Hereinafter, the configurations of the BS 40 and the network control apparatus 60 according to the embodiment will be described in detail.

Figure 6:
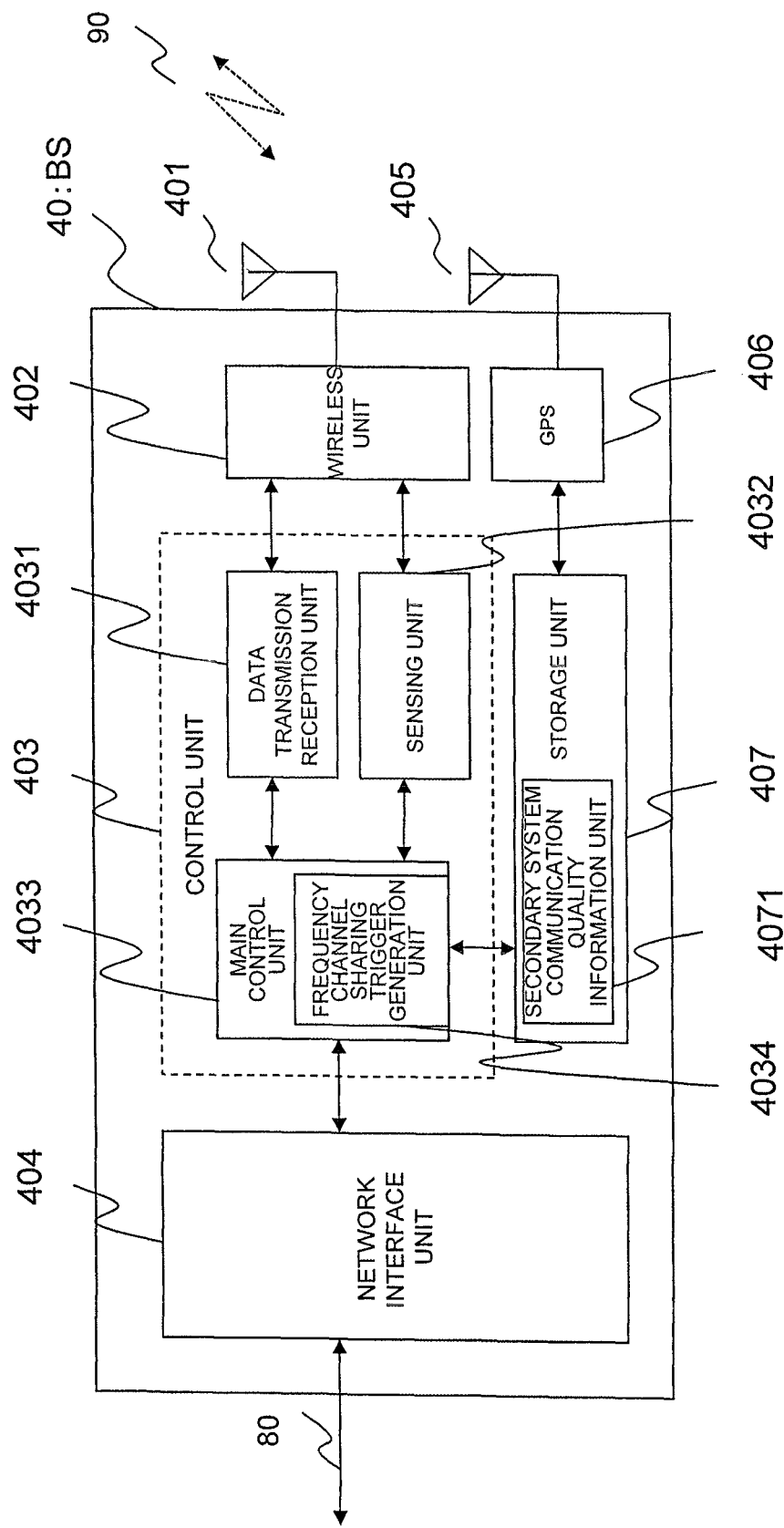
FIG. 6 is a block diagram illustrating the configuration of a BS according to the first embodiment.

FIG. 6 is a block diagram illustrating the configuration of the BS 40. The BS 40 includes at least a BS antenna 401, a wireless unit 402, a control unit 403, a network interface unit 404, a Global Positioning System (GPS) 406, a GPS antenna 405, and a storage unit 407. The control unit 403 includes a data transmission reception unit 4031, a sensing unit 4032, a main control unit 4033, and a frequency channel sharing trigger generation unit 4034. The storage unit 407 includes a secondary system communication quality information unit 4071.

The wireless unit 402 includes devices processing wireless high-frequency signals, such as an up-converter, a down-converter, a filter, and a power amplification unit. When the wireless unit 402 receives a wireless signal, the wireless unit 402 converts the high-frequency signal received from the antenna 401 into a low-frequency signal and transmits the low-frequency signal to the data transmission reception unit 4031 and the sensing unit 4032. When the wireless unit 402 transmits a wireless signal, the wireless unit 402 converts a low-frequency signal of the data transmission reception unit 4031 and the sensing unit 4032 into a high-frequency signal and transmits a radio wave from the antenna 401.

The data transmission reception unit 4031 performs baseband signal processing (including gain adjustment unit, synchronization unit, and modulation demodulation unit) and a scheduling process, or the like.

The sensing unit 4032 senses a signal of the primary system or the secondary system. There are various sensing methods such as power detection for measurement of a reception signal level of a target system and feature detection for detection of a feature amount of a signal. Herein, it is not necessary to use a specific sensing method and a method of detecting presence or absence of a signal of the primary system or a signal of the secondary system may be used.

The main control unit 4033 controls data flow in cooperation with the data transmission reception unit 4031, the sensing unit 4032, and the network interface unit 404. Communication quality information (to be described below in FIG. 11) acquired from the CPE and the BS is stored in the storage unit 407 (secondary system communication quality information unit 4071) or the stored communication quality information is read from the storage unit 407 (secondary system communication quality information unit 4071). The main control unit 4033 includes a frequency channel sharing trigger generation unit 4034 and the frequency channel sharing trigger generation unit 4034 generates a frequency channel sharing trigger when an operational frequency channel is insufficient.

The GPS 406 is a system that accurately calculates where the BS is located on the earth using artificial satellites. A signal coming from the GPS satellite and captured by the GPS antenna 405 is received and the position (the latitude, the longitude, the altitude) of the BS 40 is stored in the storage unit 407.

The storage unit 407 is a non-volatile storage device such as a magnetic disk drive or a non-volatile semiconductor memory. The storage unit 407 stores various application programs executed by the main control unit 4033 and secondary system communication quality information (see FIG. 11) is stored in the secondary system communication quality information unit 4071.

The network interface unit 404 is an interface with the wired network 80 or an interface with an application in the BS, and performs a process of transmitting or receiving a transmission target signal in the communication system. The network interface unit 404 performs a predetermined communication process conforming to, for example, IEEE802.22, data extraction, or the like. The network interface unit 404 also performs capsulation to Simple Network Management Protocol (SNMP).

Figure 7:
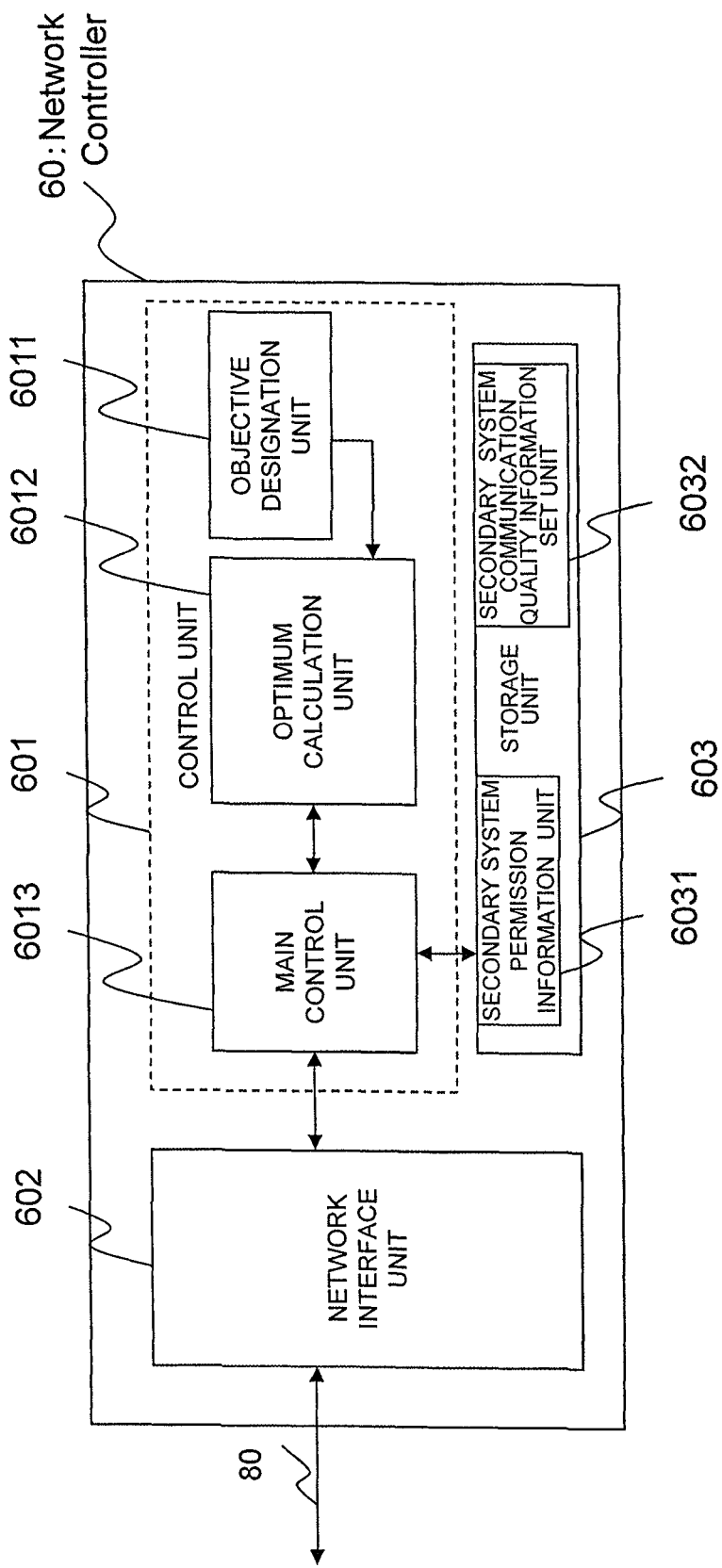
FIG. 7 is a block diagram illustrating the configuration of a network control apparatus according to the first embodiment.

FIG. 7 is a block diagram illustrating the configuration of the network control apparatus 60. The network control apparatus 60 includes at least a control unit 601, a network interface unit 602, and a storage unit 603. The control unit 601 includes an objective designation unit 6011, an optimal calculation unit 6012, and a main control unit 6013. The storage unit includes a secondary system permission information unit 6031 and a secondary system communication quality information set unit 6032.

The objective designation unit 6011 designates an objective (policy) for the optimal calculation unit 6012. For example, resignation of a communication capacity (to be described below in Expression (5)), a system throughput, the number of users (to be described below in Expression (6)), and a frequency (to be described below in Expression (9)) are received as the objective (policy) of the secondary system. The objective (policy) is a parameter associated with an operation of the secondary system. The objective (policy) may be set in advance and the objective (policy) may be changed according to a situation such as communication quality or the number of users.

The optimal calculation unit 6012 calculates optimal BS transmission power according to designation of the objective designation unit 6011 using the secondary system permission information and the secondary system communication quality information stored in the storage unit 603. The main control unit 6013 delivers the result of calculated transmission power to the network interface unit 602.

The main control unit 6013 controls data flow in cooperation with the optimal calculation unit 6013 or the network interface unit 602. A communication quality information set (to be described below in FIG. 13) acquired from the CPE and the BS is stored in the storage unit 603 (secondary system communication quality information set unit 6032) or the stored communication quality information set is read from the storage unit 603.

The network interface unit 602 is an interface with the wired network 80 or an interface with an application in the network control apparatus 60, and performs a process of transmitting or receiving a transmission target information signal in the communication system. The network interface unit 602 performs a predetermined communication process conforming to, for example, IEEE802.22, data extraction, or the like. The network interface unit 602 also performs capsulation to Simple Network Management Protocol (SNMP).

The storage unit 603 is a non-volatile storage device such as a magnetic disk drive or a non-volatile semiconductor memory. The storage unit 603 stores various application programs executed by the main control unit 6013, a secondary system communication quality information set (to be described below in FIG. 13) is stored in the secondary system information set unit 6032, and secondary system permission information (to be described below in FIG. 15) is stored in the secondary system permission information unit 6031.

2. Communication Sequence

Next, a communication sequence (see FIGS. 8 and 9) of transmission power control will be described. In the transmission power control according to the embodiment, it is necessary to acquire communication quality information in advance. In the embodiment, a communication quality information acquisition process is not included in a transmission power control process and is described as a separate process. However, the communication quality information acquisition process may be included in the transmission power control process.

Figure 8:
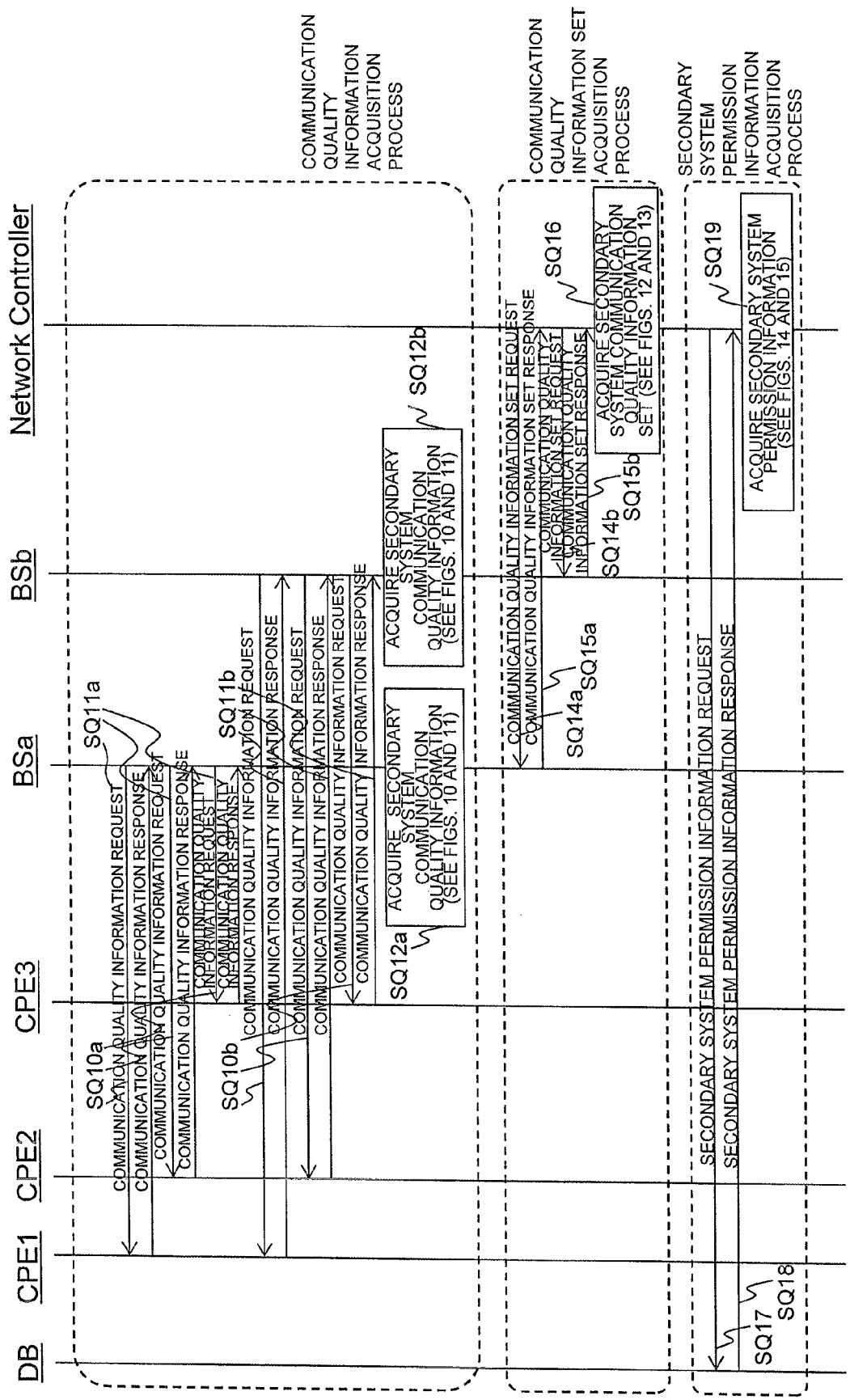
FIG. 8 is a diagram illustrating an example of a communication sequence for acquisition of communication quality information used for transmission power control according to the first embodiment.

FIG. 8 illustrates an example of a communication sequence for acquisition of the communication quality information used for the transmission power control.

The BS acquires the communication quality information measured by the CPE (communication quality information acquisition process).

For example, the BSa transmits a communication quality information request packet to the CPE (SQ10a) and receives a communication quality information response packet from the CPE (SQ11a). The BSa acquires the communication quality information (SQ12a) and stores the communication quality information in the secondary system communication quality information unit 4071 included in the storage unit 407. Likewise, the BSb transmits a communication quality request packet (SQ10b) to the CPE and receives a communication quality information response packet from the CPE (SQ11b). The BSb acquires the communication quality information (SQ12b) and stores the communication quality information in the secondary system communication quality information unit 4071 included in the storage unit 407.

In the embodiment, the BS actively transmits the request packet to the CPE and acquires the communication quality information, but the BS may passively acquire the communication quality information. A flowchart of the communication quality information acquisition process will be described in FIG. 10 (to be described below) and the communication quality information will be described in FIG. 11 (to be described below).

Next, the network control apparatus acquires the communication quality information stored in the BS (communication quality information set acquisition process).

For example, the network control apparatus transmits a communication quality information set request packet to the BSa (SQ14a) and receives a communication quality information set response packet from the network control apparatus (SQ15a). Likewise, the BSb transmits a communication quality information set request packet (SQ14b) and receives a communication quality information set response packet from the network control apparatus (SQ15b). The network control apparatus acquires the communication quality information set and stores the communication quality information set in the secondary system communication quality information set unit 6032 included in the storage unit 603 (SQ16).

In the embodiment, the network control apparatus actively transmits the request packet to the BS and acquires the communication quality information set, but the network control apparatus may passively acquire the communication quality information set. A flowchart of the communication quality information set acquisition process will be described in FIG. 12 (to be described below) and the communication quality information set will be described in FIG. 13 (to be described below).

Further, the network control apparatus acquires the secondary system permission information stored in the DB (secondary system permission information acquisition process).

For example, the network control apparatus transmits a secondary system permission information request packet to the DB (SQ17) and receives a secondary system permission information response packet from the network control apparatus (SQ18). The network control apparatus acquires the secondary system permission information and stores the secondary system permission information in the secondary system permission information unit 6031 included in the storage unit 603 (SQ19).

In the embodiment, the network control apparatus actively transmits the request packet to the DB and acquires the secondary system permission information, but the network control apparatus may passively acquire the network control apparatus.

Figure 9:
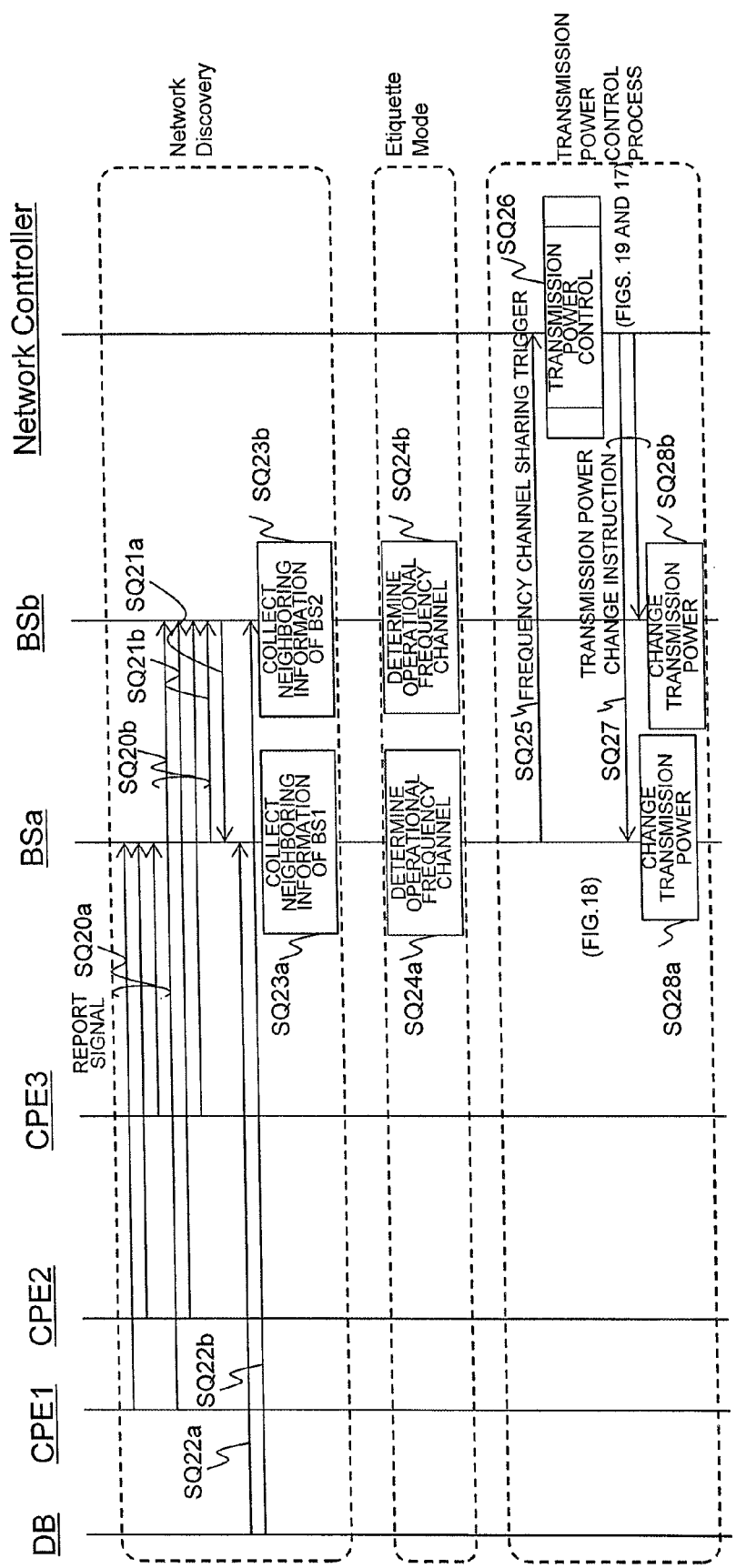
FIG. 9 is a diagram illustrating an example of a communication sequence for transmission power control according to the first embodiment.

FIG. 9 illustrates an example of a communication sequence for the transmission power control.

The BS acquires adjacent cell information such as already used frequency channels or neighboring information such as available frequency channels (Available Channel) (Network Discovery).

For example, the BSa stores a report signal (SQ20a) transmitted from the CPE, a report signal (SQ21a) of the BSb which is another station, and the secondary system permission information (SQ22a) acquired from the DB 50 as the neighboring information in the storage unit 407 of the BSa (SQ23a).

Likewise, the BSb stores a report signal (SQ20b) transmitted from the CPE, a report signal (SQ21b) of the BSa which is another station, and the secondary system permission information (SQ22b) acquired from the DB 50 as the neighboring information in the storage unit 407 of the BSb (SQ23b).

Next, the BS determines an operational frequency channel which does not overlap with the frequency channel between the adjacent cells (Etiquette Mode).

A frequency channel to actually be operated is selected from the adjacent cell information or the neighboring information such as available frequency channels (Available Channel) stored in the storage unit 407 through Network Discovery (SQ24a and SQ24b).

Next, the network control apparatus calculates optimal transmission power using the acquired communication quality information set in response to a frequency channel sharing trigger transmitted from the BS and changes the transmission power of the BS (transmission power control process).

In Etiquette Mode, the operational frequency channel is determined so that the frequency does not overlap with the frequencies of the adjacent cells. When the operational frequency channel is insufficient, the BS transmits the frequency channel sharing trigger (SQ25). When the network control apparatus 60 receives the frequency channel sharing trigger, the network control apparatus 60 calculates optimal transmission power of the BS using the same shared frequency channel (SQ26). The transmission power is calculated by the optimal calculation unit 6012. When the network control apparatus transmits a transmission power change instruction packet to the BS using the same shared frequency channel (SQ27), the transmission power of the BS is changed (SQ28a and SQ28b).

A flowchart of the frequency channel sharing trigger of the BS will be described in FIG. 18 (to be described below) and a flowchart of the transmission power control will be described in FIG. 19 (to be described below).

3. Detailed Process

Figure 10:
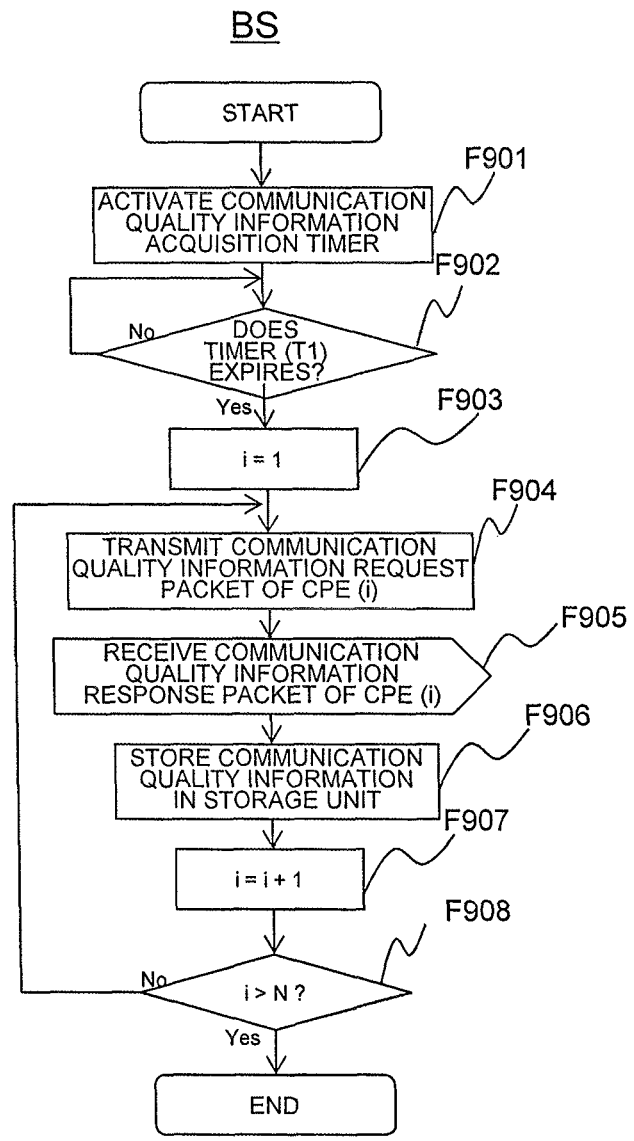
FIG. 10 is a flowchart illustrating acquisition of secondary system communication quality information in the BS according to the first embodiment.

FIG. 10 illustrates an example of a flowchart of the communication quality information acquisition process in the BS. The communication quality information acquisition process is performed periodically in the BS. First, the main control unit 4033 activates a communication quality information acquisition timer (F901). When the timer (T1) expires (F902), the main control unit 4033 initializes the value of a parameter i used to select the CPE (i) (F903). Thereafter, the network interface unit 404 generates a communication quality information request packet (SQ10) of the CPE (i) and the communication quality information request packet (SQ10) is transmitted to the CPE (i) (F904).

Next, when the communication quality information is received from the CPE (i) (F905), the communication quality information is stored in the secondary system communication quality information unit 4071 of the storage unit 407 (F906). Thereafter, the value of the parameter i is increased (F907) and the parameter i and the number N of entries of the storage unit 407 are compared to each other (F908). When i>N, the process ends. Otherwise, the communication quality information regarding another CPE (i+1) is acquired.

The main control unit 4033 may change the time of the timer (T1) at an occurrence period of the frequency channel sharing trigger (SQ25). For example, when an activation period of the primary system is short, the received power is considerably varied at a short period with fading or movement of the CPE, or an occurrence period of the frequency channel sharing trigger (SQ25) is short, the secondary system communication quality information is obtained with higher accuracy by setting the timer (T1) to be short. On the other hand, when the timer (T1) is set to be long, the number of secondary system communication quality information decreases. Thus, the capacity of the storage unit 407 can be reduced.

FIG. 11 is diagram illustrating an example of the communication quality information acquired in the BS. The secondary system communication quality is stored in the secondary system communication quality information unit 4071 of the storage unit 407. The communication quality information includes, for example, an identifier (CPEID) of the CPE, positional information (LocationCPE) regarding the CPE, an address (AddressCPE) of the CPE, frequency channel information (Channel), and received power (Received Power). The identifier (CPEID) of the CPE is unique identification of the CPE and is stored in the storage unit of the CPE. The positional information (LocationCPE) regarding the CPE may be positional information measured by a Global Positioning System (GPS) mounted on the CPE or may be positional information registered when the CPE is installed. The address (AddressCPE) of the CPE is the address (IP address) of the CPE used to identify a communication apparatus connected to the Internet or an intra-net and is stored in the storage unit of the CPE. The frequency channel information (Channel) is information regarding the frequency channel of the secondary system measured in the CPE and is used as a set with the received power (Received Power). The received power (Received Power) is received power measured with the frequency channel and transmitted from the BS in the CPE.

An acquisition time (time) may be used as a set with the communication quality information and may be used to determine whether it is necessary for the BS to update the communication quality information.

For the received power (Received Power), a reception signal strength (RSSI) may be used.

The communication quality information may be a statistical value obtained by averaging or the like to reduce the capacity of the storage unit and to reduce a traffic amount between the BS and the network control apparatus.

Figure 12:
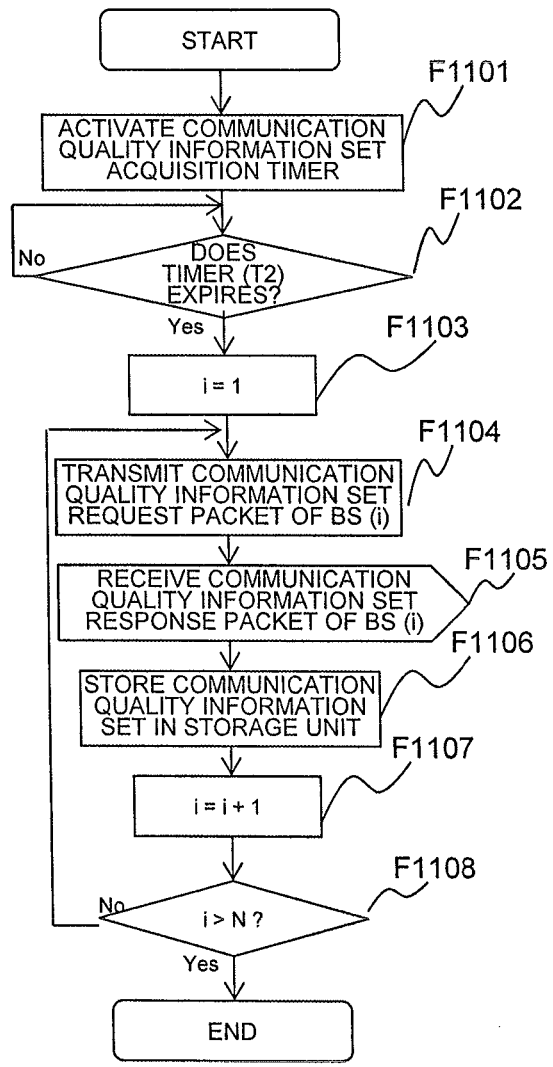
FIG. 12 is a flowchart illustrating acquisition of a secondary system communication information set in a network control apparatus according to the first embodiment.

FIG. 12 illustrates an example of the flowchart of the communication quality information set acquisition process in the network control apparatus. The communication quality information set acquisition process is performed periodically in the network control apparatus. First, the main control unit 6013 activates a communication quality information set acquisition timer (F1101). When the timer (T2) expires (F1102), the main control unit 6013 initializes the value of a parameter i used to select the BS (i) (F1103), the network interface unit 602 generates a communication quality information request set packet (SQ14) of the BS (i), and the communication quality information request set packet (SQ14) is transmitted to the BS (i) (F1104). Next, the main control unit 6013 receives a communication quality information response packet (SQ15) from the BS (i) (F1105) and stores the communication quality information response packet in the secondary system communication quality information set unit 6032 of the storage unit 603 (F1107). Thereafter, the main control unit 6013 increases the value of the parameter i (F1108) and compares the parameter i to the number N of entries of the storage unit 603 (F1108). When i>N, the process ends. Otherwise, the communication quality information set regarding another BS (i+1) is acquired.

The main control unit 6013 may change the time of the timer (T2) at an occurrence period of the frequency channel sharing trigger (SQ25). For example, when an activation period of the primary system is short, the received power is considerably varied at a short period with fading or movement of the CPE, or an occurrence period of the frequency channel sharing trigger (SQ25) is short, the secondary system communication quality information set is obtained with higher accuracy by setting the timer (T2) to be short. On the other hand, when the timer (T2) is set to be long, the number of secondary system communication quality information sets decreases. Thus, the capacity of the storage unit 603 can be reduced.

FIG. 13 is a diagram illustrating an example of the secondary system communication quality information set acquired in the network control apparatus. The secondary system communication quality information set is stored in the secondary system communication quality information set unit 6032 of the storage unit 603. The communication quality information includes, for example, an identifier (CPEID) of the CPE, positional information (LocationCPE) regarding the CPE, an address (AddressCPE) of the CPE, the identifier (BSID) of the BS, positional information (LocationBS) regarding the BS, an address (AddressBS) regarding the BS, frequency channel information (Channel), and received power (Received Power).

The identifier (BSID) of the BS is unique identification of the BS and is stored in the storage unit 407 of the BS. The positional information (LocationBS) regarding the BS may be positional information measured by the Global Positioning System (GPS) 406 mounted on the BS or may be positional information registered when the BS is installed. The address (AddressBS) of the BS is the address (IP address) of the BS used to identify a communication apparatus connected to the Internet or an intra-net and is stored in the storage unit 407 of the BS.

The identifier (CPEID) of the CPE, the positional information (LocationCPE) regarding the CPE, the address (AddressCPE) of the CPE, the frequency channel information (Channel), and the received power (Received Power) have been described above.

An acquisition time (time) may be used as a set with the communication quality information and may be used to determine whether it is necessary for the BS to update the communication quality information.

The communication quality information set may be a statistical value obtained by averaging or the like to reduce the capacity of the storage unit and to reduce a traffic amount between the BS and the network control apparatus.

Figure 14:
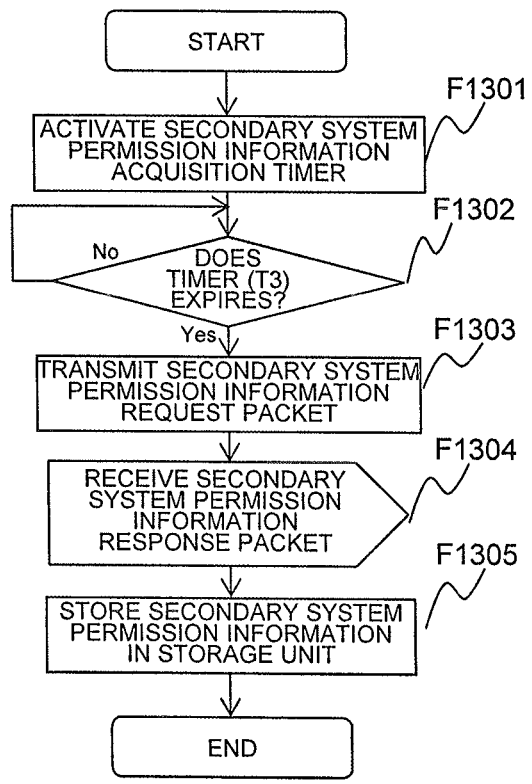
FIG. 14 is a diagram illustrating a process of acquiring secondary system permission information in the network control apparatus according to the first embodiment.

FIG. 14 illustrates an example of the flowchart of the secondary system permission communication acquisition process in the network control apparatus.

The secondary system permission information acquisition process is performed periodically in the network control apparatus. First, the main control unit 6013 activates a secondary system permission information acquisition timer (F1301). When the timer (T3) expires (F1302), the main control unit 6013 generates a secondary system permission information request packet (SQ17) of the DB 50 in the network interface unit 602 and transmits the secondary system permission information request packet to the DB 50 (F1303). Next, the main control unit 6013 acquires a secondary system permission response packet (SQ18) from the DB 50 (F1304) and stores the secondary system permission information in the secondary system permission information unit 6031 of the storage unit 603 (F1305).

The main control unit 6013 may change the time of the timer (T3) at an occurrence period of the frequency channel sharing trigger (SQ25). For example, when an activation period of the primary system is short, the received power is considerably varied at a short period with fading or movement of the CPE, or an occurrence period of the frequency channel sharing trigger (SQ25) is short, the primary system permission information with higher accuracy is obtained with higher accuracy by setting the timer (T3) to be short. On the other hand, when the timer (T3) is set to be long, the primary system permission information decreases. Thus, the capacity of the storage unit 603 can be reduced.

Figure 15:
FIG. 15 is a diagram illustrating an example of the secondary system permission information acquired in the network control apparatus according to the first embodiment.

FIG. 15 is a diagram illustrating an example of the secondary system permission information acquired in the network control apparatus. The secondary system permission information is stored in the secondary system permission information unit 6031 of the storage unit 603. The secondary system permission information includes, for example, an apparatus ID (CPEID, BSID), a position (Location) at which the secondary system is operated, antenna height (Allowable Antenna Height) at which the secondary system is available, frequency information (Available Channel) which can be used by the secondary system, and maximum transmission power (MaxPower) of the secondary system. The secondary system permission information may be a statistical value obtained by averaging or the like to reduce the capacity of the storage unit and to reduce a traffic amount between the DB and the network control apparatus.

Figure 16:
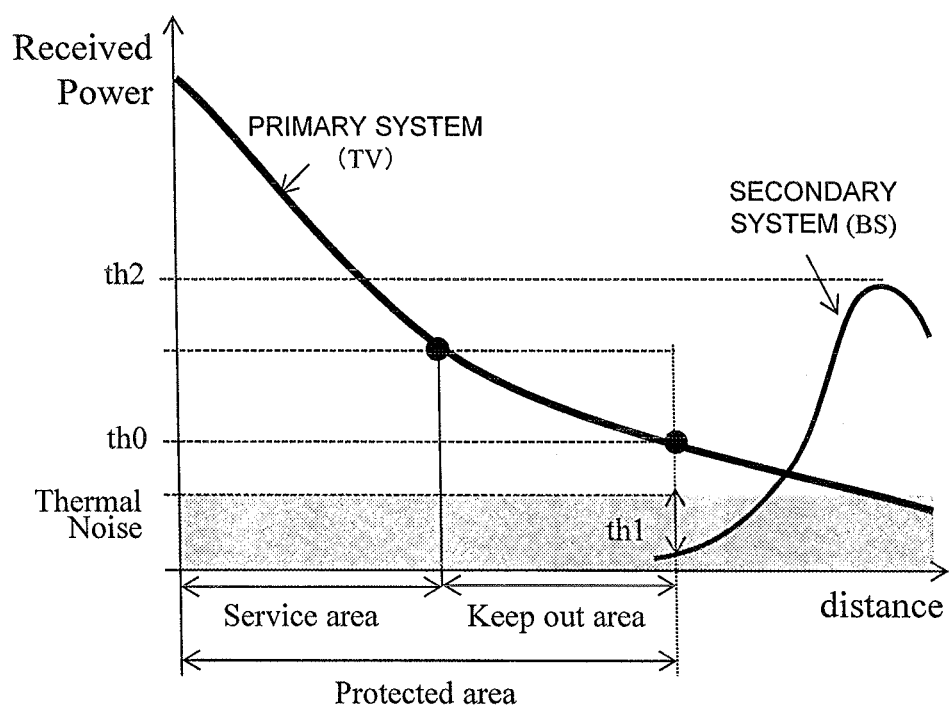
FIG. 16 is an explanatory diagram illustrating a power level when transmission power control is performed in the network control apparatus according to the first embodiment.

FIG. 16 is an explanatory diagram illustrating a power level in the transmission power control. As described above, it is necessary for the secondary system to limit the transmission power of the secondary system so that an interference-to-noise power ratio (Interference-to-Noise Ratio: INR) is ensured to be equal to or greater than an allowable interference level (th1) in an area (hereinafter referred to as a protected area) in which a received power from the primary system exceeds a predetermined level (th0). Further, it is necessary to set the transmission power of the secondary system such that the transmission power is equal to or less than a maximum value (th2) of the transmission power designated by the DB in terms of protection of the primary system.

In the embodiment, the transmission power is controlled in consideration of not only the limitation but also giving and receiving interference between the secondary systems. A problem for obtaining the transmission power of the BS of the secondary system so that a secondary system throughput is the maximum while satisfying the limitations (th0, th1, and th2) on the primary system is formularized as an optimization problem as follows.

$S_{ij}$ is a measured value of the received power received by the CPE (j) when the primary system (where i=0) and the BS (where i=1, 2) of the secondary system perform transmission at the maximum power. When $x_i$ (where i=1, 2) is a transmission power amplification rate of the BS and N is thermal noise in the CPE, an interference-to-noise power ratio ($INR_j$) in the CPE (j) of the secondary system, a signal-to-interference noise power ratio ($SINR_{1k}$) of a BS1 in the CPE (k) of the secondary system, and a signal-to-interference noise power ratio ($SINR_{2l}$) of a BS2 in the CPE (l) of the secondary system are expressed as follows.

[Math. 1]

$$INR_j = \frac{x_1 S_{1j} + x_2 S_{2j}}{N} \qquad \text{Expression (1)}$$

[Math. 2]

$$SINR_{1k} = \frac{x_1 S_{1k}}{S_{0k} + x_2 S_{2k} + N} \qquad \text{Expression (2)}$$

$$SINR_{2l} = \frac{x_2 S_{2l}}{S_{0l} + x_1 S_{1l} + N}$$

FIG. 17 is a received power classification table used to calculate the transmission power control in the network control apparatus according to the first embodiment. The above description can be summarized as follows in FIG. 17.

Since the interference-to-noise power ratio (INR) of the primary system is equal to or greater than the allowable level (th1) on the assumption that the CPE (j) is located at an end position of the protected area, a limitation condition is as follows using Expression (1).

[Math. 3]

$$INR_j \geq th1 \qquad \text{Expression (3)}$$

Since the transmission power of the secondary system is equal to or less than the maximum value (th2) of the transmission power designated by the DB, further limitation conditions of the BS1 and BS2 are as follows.

[Math. 4]

$$X_1 S_{1k} \leq th2_1 \, x_2 S_{2l} \leq th2_2 \qquad \text{Expression (4)}$$

Next, when an objective function g is assumed to be the communication capacity (total communication capacity) of the entire system, the following expression can be obtained as an index for evaluating the degree of the objective accomplishment of the secondary system using Expression (2) and the Shannon's expression.

[Math. 5]

$$g = \sum_{k \in K} B \log_2(1 + SINR_{1k}) + \sum_{l \in L} B \log_2(1 + SINR_{2l}) \qquad \text{Expression (5)}$$

B is a frequency bandwidth. When the optimization problem is solved, the transmission power amplification rate $x_i$ (transmission power) of the BS (where i=1, 2) can be obtained. Here, K (where k=1, 2, . . . , K) is the number of CPEs in the BS1 and L (l=1, 2, . . . , L) is the number of CPEs in the BS2. This problem uses a reciprocity relation that signal power increases for the CPE connected to the self-BS and interference power increases for the CPE connected to another BS according to the magnitude of the transmission power of the BS. Therefore, as in FIG. 17, note that the received power from the BS to which the CPE belongs is classified as signal power (Signal Power) and the received power from the adjacent BS to which the CPE does not belong is classified as interference power (Interference Power).

Here, a communication amount obtained with the Shannon's expression is generally a theoretically accomplished upper-bound value. Thus, for an actual system throughput, a throughput obtained through table conversion with the SINR can also be used as an objective function by Link Adaptation (LA).

When the objective function g is expanded to a form considering the number of users indicated by user coefficients, a user coefficient ($W_1$) of the BS1 and a user coefficient ($W_2$) of the BS2, the objective function g can be expressed as follows.

[Math. 6]

$$g = \sum_{k \in K} W_1 B \log_2(1 + SINR_{1k}) + \sum_{l \in L} W_2 B \log_2(1 + SINR_{2l}) \qquad \text{Expression (6)}$$

Since the transmission power can be determined including even the number of users, the communication performance can be further improved.

When the frequency channel is insufficient and a frequency is necessarily be shared with the BS installed at a distance at which interference mutually occurs, an overhead at the time of sharing of a frequency channel used in an adjacent cell (Self-Coexistence Mode) may be considered in the calculation.

This problem can be solved using a nonlinear programming method. This problem can also be solved using not only full search but also a meta-heuristic method such as pattern search or genetic algorithm (GA). Thus, efficient calculation can be realized with a small calculation amount.

In the embodiment, the one primary system, two BS and BS of the secondary systems, and the two CPEs have been described, but the numbers thereof are not limited thereto. The frequency channel and the number of users have been expressed with one variable, but the present invention is not limited thereto.

The CPE (j) is assumed to be located at an end point of the protected area, but the CPE (j) may be located at a position other than the end position of the protected area. In this case, by converting interference power at the position other than the endpoint of the protected area into interference power at the end point of the protected area, the interference-to-noise power ratio (INR) is calculated. For example, on the assumption that received power S when the CPE receives a signal transmitted from the BS is expressed as a function S(d) of a distance d between the BS and the CPE, x is a transmission power amplification rate and d1 is a distance between the BS and the CPE located at a position other than the end point of the protected area, and received power R1 of the CPE located at the position other than the end point of the protected area can be expressed as follows:

$$R1 = x \times S(d1) \qquad \text{Expression (7).}$$

Since the acquired position (LocationBS) of the BS and the position (LocationCPE) of the CPE are stored in the secondary system communication quality information set (6032), a distance d0 between the BS and the CPE located at the end point of the protected area can be calculated. Accordingly, received power R0 of the CPE located at the end point of the protected area can be converted from the received power R using Expression (7) as follows:

$$R0 = S(d0) \div S(d1) \times R1 \qquad \text{Expression (8).}$$

Figure 18:
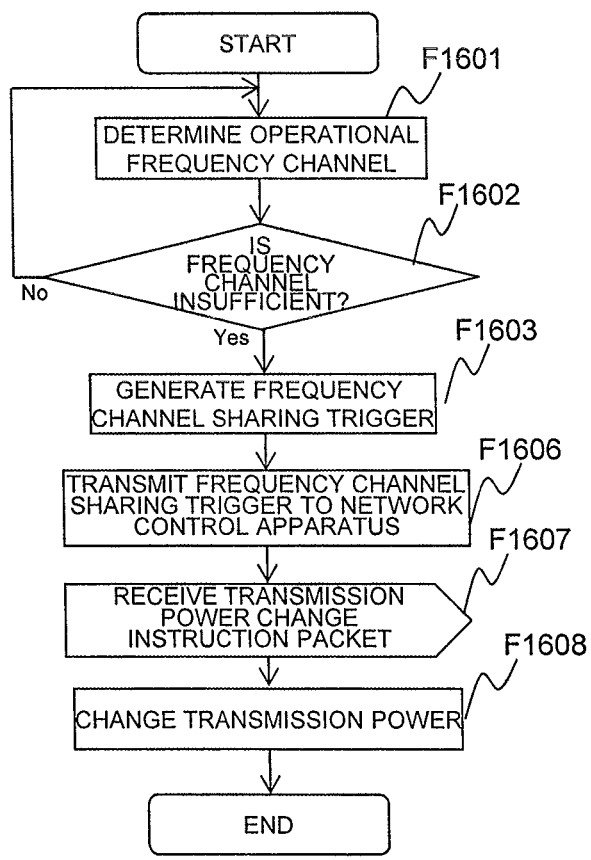
FIG. 18 is a flowchart illustrating a frequency channel sharing trigger in the BS according to the first embodiment.

FIG. 18 illustrates a flowchart of the frequency channel sharing trigger of the BS. The frequency channel sharing trigger (SQ25) is generated by the frequency channel sharing trigger generation unit 4034 of the BS 40.

First, the main control unit 4033 of the BS determines the frequency channel operated so that the frequency does not overlap with the frequency of an adjacent cell (Etiquette Mode) (F1601). When the frequency channel is insufficient (F1602), the main control unit 4033 (the frequency channel sharing trigger generation unit 4034) generates the frequency channel sharing trigger (SQ25) (F1605) and transmits the frequency channel sharing trigger (SQ25) to the network control apparatus (F1606). At this time, the main control unit 4033 may capsulate the frequency channel sharing trigger to an SNMP or the like in the network interface unit 404 and transmits the capsulated frequency channel sharing trigger to the network control apparatus. Next, when the main control unit 4033 receives a transmission power change instruction packet from the network control apparatus (F1607), the main control unit 4033 reads a changed value (TXpower) of the transmission power stored in the packet and changes the transmission power by controlling the power amplifier of the wireless unit 402 or a gain adjustment unit of the data transmission reception unit 4031 (F1608, SQ28).

Figure 19:
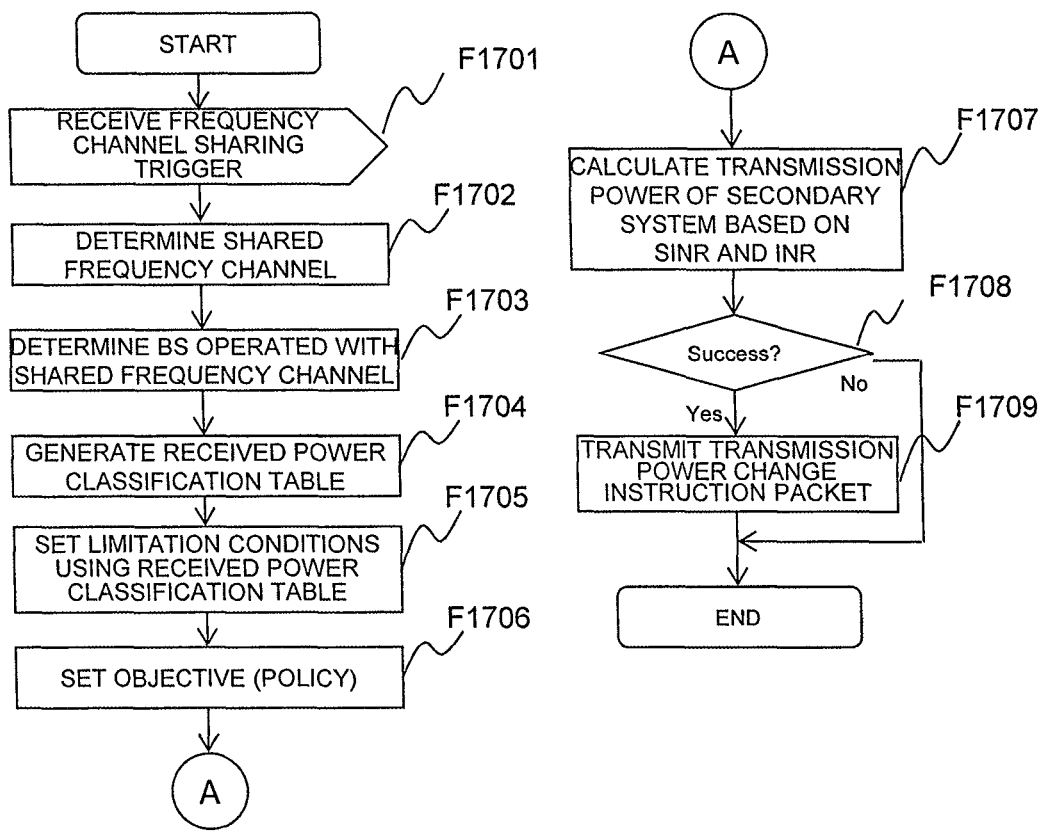
FIG. 19 is a flowchart illustrating the transmission power control in the network control apparatus according to the first embodiment.

FIG. 19 illustrates a flowchart of the transmission power control of the network control apparatus. The process is performed by the optimal calculation unit 6012 of the network control apparatus 60.

First, when the control unit 601 receives the frequency channel sharing trigger (SQ25) from the BS 40 (F1701), the control unit 601 determines a shared frequency channel (F1702) and determines the BS operated with the shared frequency channel (F1703). According to a method of determining the shared frequency channel, a frequency channel of which a use degree is low is determined based on, for example, the received power (Received Power), an acquisition time (time), and/or the frequency information (Available Channel) used to use the secondary system, which are stored in the storage unit 603 (the secondary system communication quality information set unit 6032 and/or the secondary system permission information unit 6031). In addition, the network control apparatus 60 can retain use information regarding a frequency channel, such as a use band bandwidth and the number of available wireless terminals, the number of available BS, and a use time in regard to each frequency channel, and determine a frequency channel of which a use frequency is low using the appropriate information. When the frequency channel is determined, the sharing BS is specified from the BSID associated with the determined frequency channel.

Next, the control unit 601 (the optimal calculation unit 6012) generates the received power classification table (see FIG. 17) in which the signal power and the interference power of the secondary systems are classified from the received power (Received Power) stored in the secondary system communication quality information set unit 6032 (F1704). The control unit 601 (the optimal calculation unit 6012) sets the limitation conditions so that the interference-to-noise power ratio (INR) at the end point of the protected area is equal to or greater than the allowable level (th1) (Expression (3)) and the transmission power of the secondary system is equal to or less than the maximum transmission power (th2) (Expression (4)) using the received power classification table (F1705). Further, the control unit 601 (the optimal calculation unit 6012) sets the objective function (Expression (5) and Expression (6)) using the received power classification table (F1706). The control unit 601 (the optimal calculation unit 6012) calculates the transmission power amplification rate (or the transmission power) of the secondary system within the scope of the set limitation conditions so that the objective (policy) designated by the objective designation unit 6011 is accomplished (F1707). The control unit 601 (the optimal calculation unit 6012) determines whether the calculation of the transmission power amplification rate (or the transmission power) succeeds (F1708). When the calculation succeeds, the control unit 601 generates the transmission power change instruction packet storing the calculated transmission power amplification rate (or the transmission power) and transmits the transmission power change instruction packet (SQ27) to the sharing BS (F1709).

Figure 20:
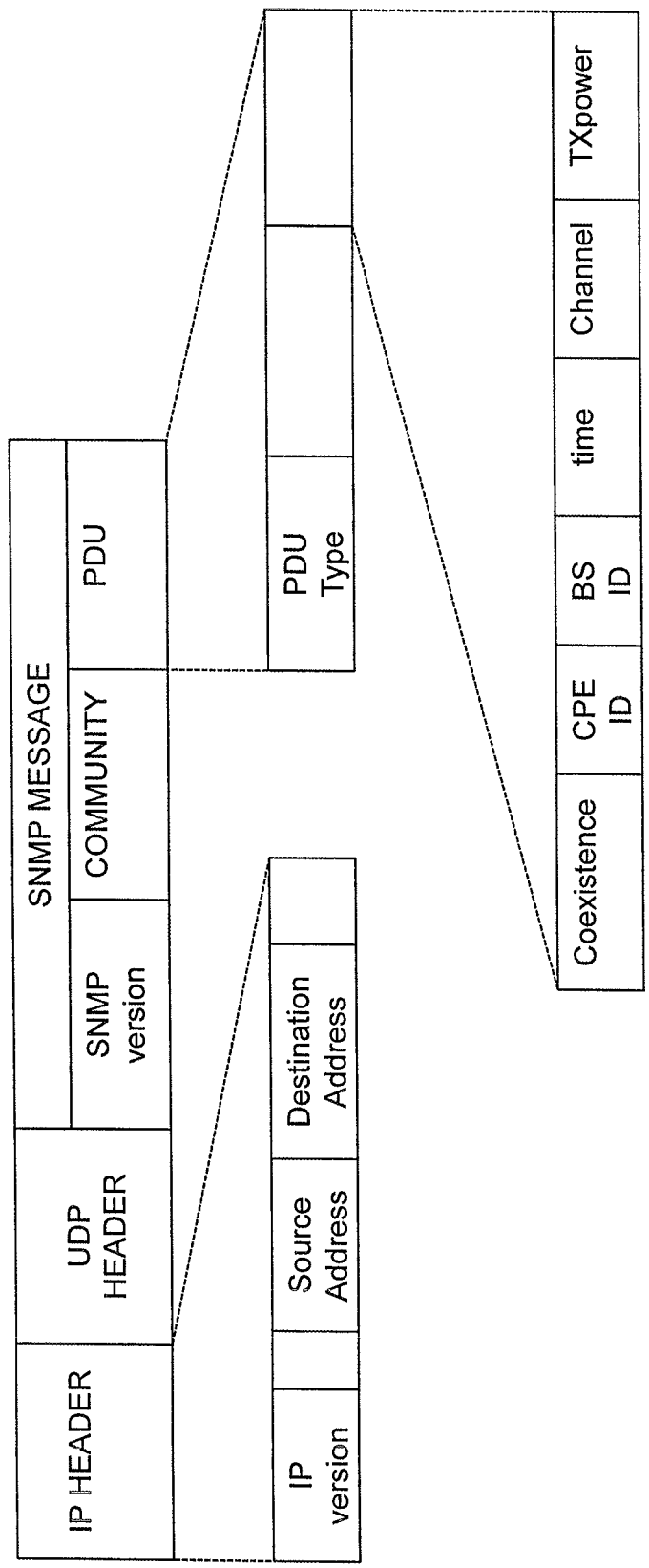
FIG. 20 is a diagram illustrating an example of the frame format of a control message applied to the first embodiment.

FIG. 20 illustrates an example of the frame format of a control message applied to the embodiment. An IP header has an IP version, Source Address, and Destination Address. For example, when the communication is performed between the BS and the network control apparatus as in the communication quality information set acquisition process (FIG. 8: SQ14a, SQ14b, SQ15a, and SQ15b), the address of the BS and the address of the network control apparatus are described in Source Address and Destination Address, respectively. When the control is performed using the SNMP, the secondary system communication quality information set in FIG. 13 is described in a PDU of the SNMP.

For example, when the communication is performed between the DB and the network control apparatus as in the secondary system permission information acquisition process (FIG. 8: SQ17 and SQ18), the address of the DB and the address of the network control apparatus are described in Source Address and Destination Address, respectively. When the control is performed using the SNMP, the secondary system permission information in FIG. 15 is described in a PDU of the SNMP.

For example, when the communication is performed between the BS and the network control apparatus as in the transmission power control process (FIG. 9: SQ25, SQ27, and SQ28), the address of the BS and the address of the network control apparatus are described in Source Address and Destination Address, respectively. When the control is performed using the SNMP, an identifier (Coexistence) indicating whether to share a frequency, the identifier (BSID) of the sharing BS, the shared start time (time), the shared frequency channel information (Channel), and the change value (TXpower) of the transmission power are described in a PDU of the SNMP.

In Self-Coexistence of IEEE802.22, Superframe Control Header (SCH) and Coexistence Beacon Protocol (CBP) are used between the CPE and the BS and between the BS and the BS, and thus may be applied to the embodiment.

Figure 21:
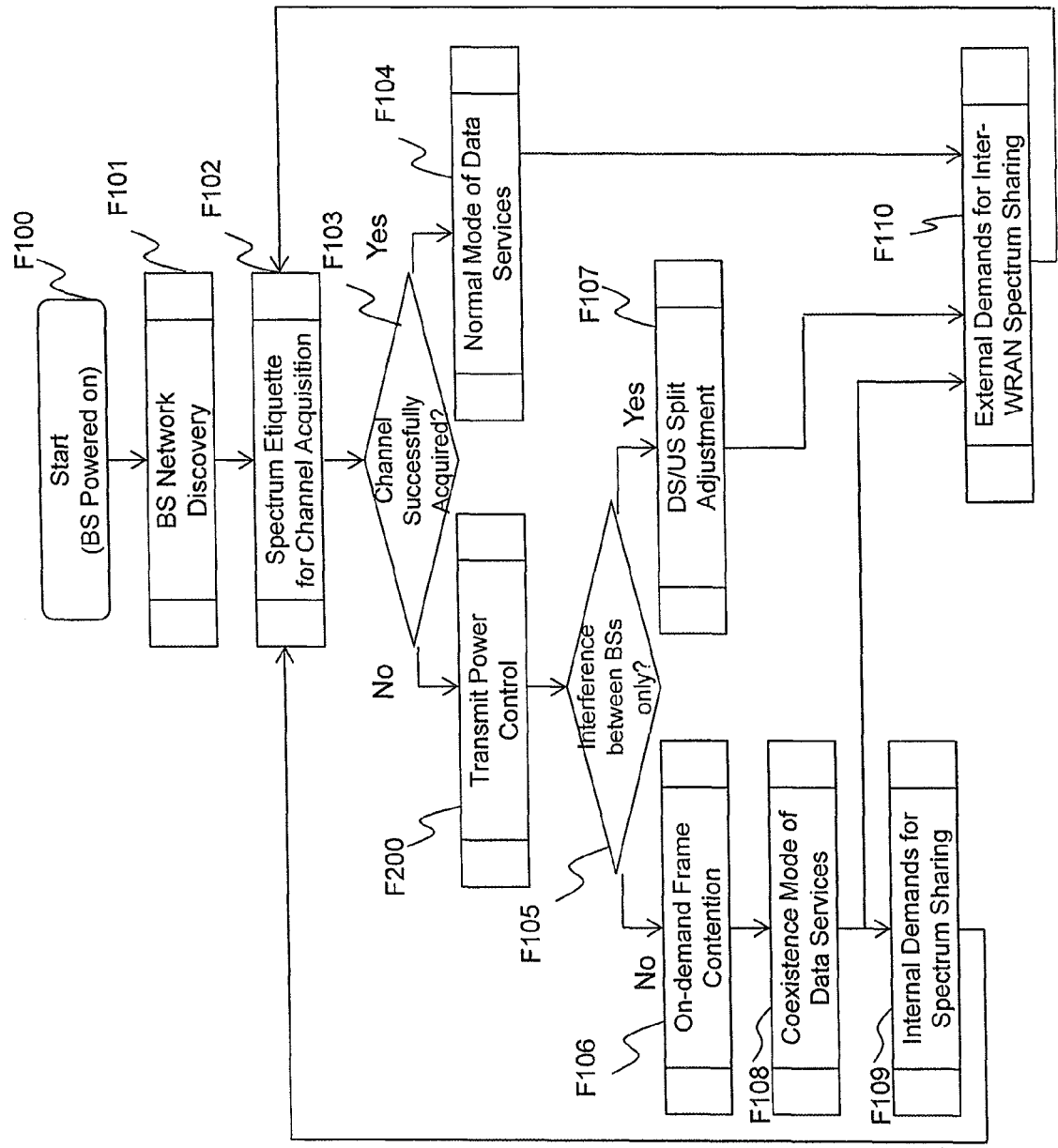
FIG. 21 is a flowchart illustrating Self-Coexistence when the first embodiment is applied to IEEE802.22.

FIG. 21 illustrates a flowchart of Self-Coexistence when the embodiment is applied to IEEE802.22. In the embodiment, this flowchart is mainly different from that of FIG. 1 in that the transmission power control process (F200) is performed when the acquisition of the frequency channel fails (F103). That is, the BS performs the process of each step as follows.

First, when the base station is powered on (F100), BS network information is acquired (F101) and a channel is acquired (F102). Here, the process is diverged according to whether the acquisition of the channel succeeds (F103). When the acquisition of the channel succeeds, a normal mode data service (F104) is performed. Conversely, when the acquisition of the channel fails in the step F103, the above-described transmission power control process (F200) is performed. Next, when a frequency is shared with an adjacent BS (cell) through determination of an interference source, the process is diverged (F105) according to whether interference occurs only between the base stations or interference also occurs in the CPE (terminal) belonging to the adjacent BS. When the interference occurs between the base stations and the interference also occurs in the CPE (No), the process proceeds to ODFC (F106). Then, an ODFC channel shared mode data service (F108) is performed and an internal addition/deletion request (F109) is performed. Conversely, when the interference occurs only between the base station in step F105 (Yes), the process proceeds to DUSA (111). After the process of each mode of the steps F108, F107, and F104 is performed, an external channel sharing request (F110) is performed.

4. Advantageous Effects of First Embodiment

Figure 4:
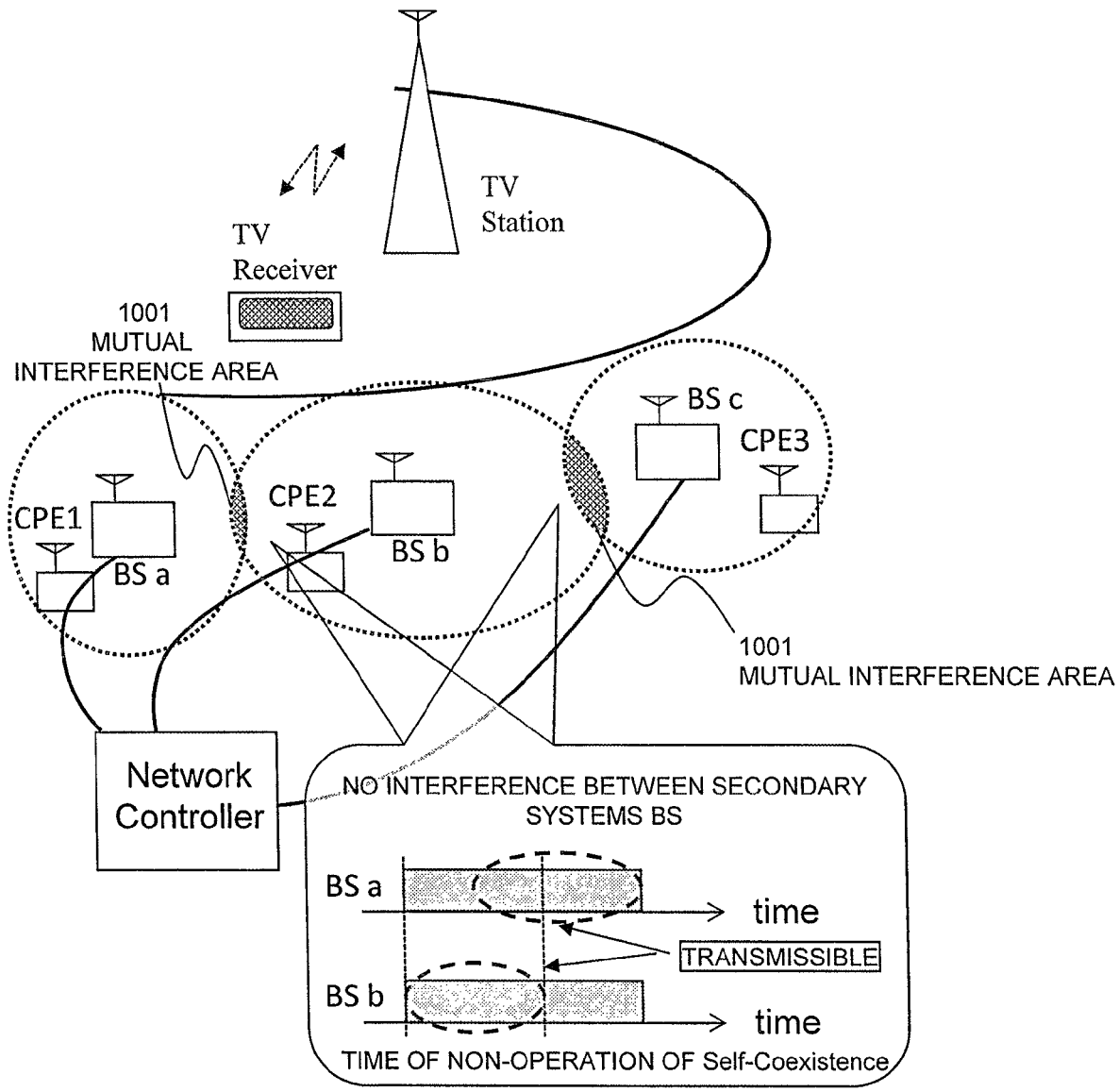
FIG. 4 is a diagram for describing advantageous effects of an embodiment.

FIG. 4 is a diagram for describing advantageous effects of the embodiment.

In IEEE802.22, as illustrated in FIG. 4, the mutual interference areas (1001) are reduced, and thus an opportunity to perform the Self-coexistence function is suppressed. Further, the communication performance of the secondary system is improved.

According to the embodiment, the following particular advantageous effects are obtained.

According to the embodiment, the communication performance of the secondary system can be improved within a scope in which there is no influence on the TV which is the primary system.

Since the network control apparatus shares the information and the further optimal transmission power can be calculated, the communication performance is improved.

Since the information regarding the BS at which radio waves do not arrive is shared in the network control apparatus and the optimal transmission power can be calculated in consideration of the interference of the transmission power between the plurality of BSs, the communication performance can be expected to be further improved.

By averaging and using the communication quality information set, it is possible to reduce the communication amount between the BS and the network control apparatus.

By adaptively changing an acquisition period of the secondary system communication quality information set, it is possible to improve accuracy of the communication quality necessary for the transmission power control and to reduce a communication amount between the BS and the network control apparatus.

By controlling the transmission power of only the sharing BS using the trigger issued when the frequency channel is insufficient and the frequency has to be shared between the BS and the BS installed at a distance at which mutual interference occurs, it is possible to reduce the process of the transmission power control at a necessary timing.

By measuring the received power from the plurality of base stations in the network control apparatus, the optimal transmission power can be calculated in consideration of the interference of the transmission power between the base stations. Therefore, the communication performance can be expected to be further improved.

Embodiment 2

C. Second Embodiment

1. Wireless Communication System and Operation

The basis configuration of the second embodiment is the same as that of the first embodiment, and thus differences will be mainly described herein.

In the first embodiment, the frequency channel to be shared has been determined before the transmission power control process (see FIG. 19). In the second embodiment, however, a method of including the frequency channel to be shared in the transmission power control process will be described.

The objective function is expanded using frequency channel variable f (where f=1, 2, . . . , F). For example, the objective function g can be expressed when whether to use the frequency channel f of the BS1 ($y_{1f}$) and whether to use the frequency channel f of the BS2 ($y_{2f}$) are introduced.

[Math. 9]

$$g = \sum_{f \in F} \sum_{k \in K} y_{1f} B \log_2(1 + SINR_{1kf}) + \sum_{f \in F} \sum_{l \in L} y_{2f} B \log_2(1 + SINR_{2lf}).$$

Expression (9)

Thus, since the transmission power can be determined in addition to the frequency channel, the communication performance can be further improved.

FIG. 22 illustrates a flowchart of control of the transmission power and the frequency channel of the network control apparatus. The process is performed by the optimal calculation unit 6012 of the network control apparatus 60.

First, the control unit 601 (the optimal calculation unit 6012) receives the frequency channel sharing trigger (SQ25) from the BS 40 (F2201), the control unit 601 generates the received power classification table (see FIG. 17) in which the signal power and the interference power of the secondary systems are classified from the received power (Received Power) stored in the secondary system communication quality information set unit 6032 (F2202). The control unit 601 (the optimal calculation unit 6012) sets the limitation conditions so that the interference-to-noise power ratio (INR) at the end point of the protected area is equal to or greater than the allowable level (th1) (Expression (3)) and the transmission power of the secondary system is equal to or less than the maximum transmission power (th2) (Expression (4)) using the received power classification table (F2203). Further, the control unit 601 (the optimal calculation unit 6012) sets the objective function (Expression (9)) using the received power classification table (F2204). The control unit 601 (the optimal calculation unit 6012) calculates the transmission power amplification rate (or the transmission power) of the secondary system within the scope of the set limitation conditions so that the objective (policy) designated by the objective designation unit 6011 is accomplished (F2205). The control unit 601 (the optimal calculation unit 6012) determines whether the calculation of the transmission power succeeds (F2206). When the calculation succeeds, the shared frequency channel is determined (F2207) and the BS operated with the shared frequency channel is determined with reference to the secondary system permission information unit 6031 and/or the secondary system information set 6032 (F2208). Next, the control unit 601 (the optimal calculation unit 6012) generates the transmission power change instruction packet storing the calculated transmission power amplification rate (or the transmission power) and transmits the transmission power change instruction packet (SQ27) to the sharing BS (F2209).

2. Advantageous Effects of Second Embodiment

According to the second embodiment, since the transmission power can be determined in addition to the frequency channel, the communication performance can be further improved in addition to the advantageous effects of the above-described first embodiment.

REFERENCE SIGNS LIST

D. Additional Statements

The present invention is not limited to the above embodiments, but includes various modified examples. For example, in the above-mentioned embodiments, in order to easily understand the present invention, the specific configurations are described. However, the present invention does not always provide all of the configurations described above. Also, a part of one configuration example can be replaced with another configuration example, and the configuration of one embodiment can be added with the configuration of another embodiment. Also, in a part of the respective configuration examples, another configuration can be added, deleted, or replaced.

Also, parts or all of the above-described respective configurations, functions, processors, processing means may be realized, for example, as an integrated circuit, or other hardware. Also, the above respective configurations and functions may be realized by allowing the processor to interpret and execute programs for realizing the respective functions. That is, the respective configurations and functions may be realized by software. The information on the program, table, and file for realizing the respective functions can be stored in a storage device such as a memory, a hard disc, or an SSD (solid state drive), or a storage medium such as an IC card, an SD card, or a DVD.

Also, the control lines and the information lines necessary for description are illustrated, and all of the control lines and the information lines necessary for products are not illustrated. In fact, it may be conceivable that most of the configurations are connected to each other.

10 TV station
20 TV receiver
30 CPE
40 BS
50 DB
60 Network controller
70 Network
401 BS antenna
402 Wireless unit
403 Control unit
4031 data transmission reception unit
4032 Sensing unit
4033 Main control unit
4034 Frequency channel sharing trigger generation unit
404 Network interface unit
405 GPS antenna
406 GPS
407 Storage unit
4071 Secondary system communication quality information unit
601 Control unit
6011 Objective designation unit
6012 Transmission power calculation unit
6013 Main control unit
602 Network interface unit
603 Storage unit
6031 Secondary system permission information unit
6032 Secondary system communication quality information set unit

The invention claimed is:

1. A wireless communication system comprising:
a primary system that includes a wireless station and is able to primarily use a certain frequency;
one or a plurality of wireless communication systems, having a base station (BS), which are a secondary system that secondarily use the same frequency as that of the primary system; and
a network control apparatus that controls the one or the plurality of wireless communication systems, wherein the network control apparatus includes:
a secondary system communication quality information set unit that stores a communication quality information set including identification information regarding the BS of the secondary system, identification information regarding a wireless terminal, used frequency channel information, and received power, and
a control unit,
wherein,
when the network control apparatus receives a frequency channel sharing trigger indicating that a frequency channel operated so that a frequency does not overlap with that of an adjacent cell is insufficient from each BS of the secondary system, the control unit generates a received power classification table which classifies signal power and interference power between each wireless terminal, and the wireless station of the primary system and each BS of the secondary system, with reference to the secondary system communication quality information set unit and based on the identification information regarding the BS, the identification information regarding the wireless terminal, and the received power,
the control unit calculates a transmission power amplification rate or transmission power of each secondary system using the received power classification table, and
the control unit transmits a transmission power change instruction packet storing the calculated transmission power amplification rate or transmission power to each BS sharing the frequency channel of the one or the plurality of secondary systems.

2. The wireless communication system according to claim 1, further comprising:
a secondary system permission information unit that stores secondary system permission information including identification information regarding the wireless terminal or the BS, frequency information which can be used by the secondary system, maximum transmission power of the secondary system, wherein
the control unit sets limitation conditions in which an interference-to-noise power ratio at an end point of a protected area which is an area where the received power from the primary system exceeds a level determined in advance is equal to or greater than an allowable level determined in advance by using the received power classification table, and transmission power of the secondary system is equal to or less than the maximum transmission power with reference to the secondary system permission information unit, and
the control unit sets an objective function indicating a total communication capacity of the one or the plurality of secondary systems and calculates the transmission power amplification rate or the transmission power of each secondary system so that the objective function is maximum or optimal within a scope of the limitation conditions.

3. The wireless communication system according to claim 2, wherein, when the network control apparatus receives the frequency channel sharing trigger from the BS, the control unit determines a frequency channel of which a use degree is low with reference to the secondary system permission information unit and/or the secondary system communication quality information set unit, or use information of another retained frequency channel, and specifies the one or the plurality of BSs sharing the frequency channel from the identification information of the one or the plurality of BSs associated with the frequency channel.

4. The wireless communication system according to claim 3, wherein
the limitation condition are expressions below:

[Math. 1]

$$INR_j \geq th1 \quad \text{Expression (3)}$$

$$x_1 S_{1k} \leq th2_1\, x_2 S_{2l} \leq th2_2 \quad \text{Expression (4),}$$

and
the objective function is one of expressions below:

[Math. 2]

$$g = \sum_{k \in K} B\log_2(1 + SINR_{1k}) + \sum_{l \in L} B\log_2(1 + SINR_{2l}) \quad \text{Expression (5)}$$

$$g = \sum_{k \in K} W_1 B\log_2(1 + SINR_{1k}) + \sum_{l \in L} W_2 B\log_2(1 + SINR_{2l}). \quad \text{Expression (6)}$$

5. The wireless communication system according to claim 2, wherein the control unit of the network control apparatus
sets the objective function to determine the transmission power including the frequency channel, using the received power classification table,
calculates the transmission power amplification rate or the transmission power of each secondary system within the scope of the set limitation conditions and determines the frequency channel to be shared, and
specifies the one or the plurality of BSs sharing the frequency channel with reference to the secondary system permission information unit and/or the secondary system communication quality information set unit.

6. The wireless communication system according to claim 5, wherein
the limitation condition are expressions below:

[Math. 3]

$$INR_j \geq th1 \quad \text{Expression (3)}$$

$$x_1 S_{1k} \leq th2_1\, x_2 S_{2l} \leq th2_2 \quad \text{Expression (4),}$$

and
the objective function is one of expressions below:

[Math. 4]

$$g = \sum_{f \in F} \sum_{k \in K} y_{1f} B\log_2(1 + SINR_{1kf}) + \quad \text{Expression (9)}$$

$$\sum_{f \in F} \sum_{l \in L} y_{2f} B\log_2(1 + SINR_{2lf}).$$

7. The wireless communication system according to claim 2, wherein the control unit sets the objective function so that one or a plurality of objectives or polices among of a communication capacity, a system throughput, the number of users, and a frequency are accomplished as an objective or a policy of the secondary system.

8. The wireless communication system according to claim 2, wherein
the control unit transmits a request packet of secondary system permission information to a DB, and
the control unit acquires secondary system permission information including the identification information regarding the wireless terminal or the BS, frequency information which can be used by the secondary system, maximum transmission power of the secondary system from a DB, and stores the secondary system permission information in the secondary system permission information unit.

9. The wireless communication system according to claim 2, wherein
the secondary system communication quality information set and/or the secondary system permission information further includes an acquisition time, and
the control unit determines a frequency channel of which a use degree is low, by further using the acquisition time.

10. The wireless communication system according to claim 1, wherein
the control unit transmits a request packet of the communication quality information set to the one or the plurality of BSs, and
the control unit receives a secondary system communication quality information set including the identification information regarding the wireless terminal, the identification information regarding the BS, the used frequency channel information, and the received power, from the one or the plurality of BSs, and stores the secondary system communication quality information set in the secondary system communication quality information set unit.

11. The wireless communication system according to claim 1, wherein
the secondary system communication quality information set further includes positional information regarding the wireless terminal and positional information regarding the BS, and
the control unit converts the received power of the wireless terminal located at an end point of a protected area based on a distance between the BS and the wireless terminal.

12. The wireless communication system according to claim 1, wherein the BS
transmits the frequency channel sharing trigger to the network control apparatus when the frequency channel is insufficient at the time of the determination of the frequency channel operated so that the frequency does not overlap with that of the adjacent cell, and
reads a changed value of the transmission power stored in the transmission power change instruction packet and changes the transmission power, when the transmission power change instruction packet is received from the network control apparatus.

13. The wireless communication system according to claim 1, wherein the network control apparatus further includes a secondary system communication quality information unit that averages and acquires secondary system communication quality information of the secondary wireless communication systems.

14. The wireless communication system according to claim 1, wherein the frequency channel sharing trigger and/or the transmission power change instruction packet includes an identifier of the sharing BS, a sharing start time, frequency channel information, and a value of transmission power.

15. A transmission power control method in a wireless communication system, the wireless communication system comprising:
   a primary system that includes a wireless station and is able to primarily use a certain frequency;
   one or a plurality of wireless communication systems, having a base station (BS), which are a secondary system that secondarily use the same frequency as that of the primary system; and
   a network control apparatus that controls the one or the plurality of wireless communication systems, wherein
   the network control apparatus includes:
      a secondary system communication quality information set unit that stores a communication quality information set including identification information regarding the BS of the secondary system, identification information regarding a wireless terminal, used frequency channel information, and received power, and
      a control unit,
   wherein,
   when the network control apparatus receives a frequency channel sharing trigger indicating that a frequency channel operated so that a frequency does not overlap with that of an adjacent cell is insufficient from each BS of the secondary system, the control unit generates a received power classification table which classifies signal power and interference power between each wireless terminal, and the wireless station of the primary system and each BS of the secondary system, with reference to the secondary system communication quality information set unit and based on the identification information regarding the BS, the identification information regarding the wireless terminal, and the received power,
   the control unit calculates a transmission power amplification rate or transmission power of each secondary system using the received power classification table, and
   the control unit transmits a transmission power change instruction packet storing the calculated transmission power amplification rate or transmission power to each BS sharing the frequency channel of the one or the plurality of secondary systems.

16. A network control apparatus in a wireless communication system, the wireless communication system comprising:
   a primary system that includes a wireless station and is able to primarily use a certain frequency;
   one or a plurality of wireless communication systems, having a base station (BS), which are a secondary system that secondarily use the same frequency as that of the primary system; and
   the network control apparatus that controls the one or the plurality of wireless communication systems, wherein
   the network control apparatus includes:
      a secondary system communication quality information set unit that stores a communication quality information set including identification information regarding the BS of the secondary system, identification information regarding a wireless terminal, used frequency channel information, and received power, and
      a control unit,
   wherein,
   when the network control apparatus receives a frequency channel sharing trigger indicating that a frequency channel operated so that a frequency does not overlap with that of an adjacent cell is insufficient from each BS of the secondary system, the control unit generates a received power classification table which classifies signal power and interference power between each wireless terminal, and the wireless station of the primary system and each BS of the secondary system, with reference to the secondary system communication quality information set unit and based on the identification information regarding the BS, the identification information regarding the wireless terminal, and the received power,
   the control unit calculates a transmission power amplification rate or transmission power of each secondary system using the received power classification table, and
   the control unit transmits a transmission power change instruction packet storing the calculated transmission power amplification rate or transmission power to each BS sharing the frequency channel of the one or the plurality of secondary systems.

\* \* \* \* \*